(12) United States Patent
Beane

(10) Patent No.: US 8,766,470 B2
(45) Date of Patent: Jul. 1, 2014

(54) SYSTEM FOR PRODUCING ENERGY THROUGH THE ACTION OF WAVES

(71) Applicant: Gwave LLC, Hanover, NH (US)

(72) Inventor: Glenn L. Beane, Hanover, NH (US)

(73) Assignee: Gwave LLC, Hanover, NH (US)

( * ) Notice: Subject to any disclaimer, the term of this patent is extended or adjusted under 35 U.S.C. 154(b) by 0 days.

(21) Appl. No.: 13/975,445

(22) Filed: Aug. 26, 2013

(65) Prior Publication Data

US 2013/0341921 A1 Dec. 26, 2013

Related U.S. Application Data

(63) Continuation of application No. 12/850,340, filed on Aug. 4, 2010, now Pat. No. 8,519,557, which is a continuation-in-part of application No. 12/316,772, filed on Dec. 15, 2008, which is a continuation-in-part of application No. 12/079,591, filed on Mar. 27, 2008, now Pat. No. 7,755,224, which is a continuation-in-part of application No. 11/593,895, filed on Nov. 7, 2006, now abandoned.

(60) Provisional application No. 60/734,203, filed on Nov. 7, 2005.

(51) Int. Cl.
   *F03B 13/00* (2006.01)

(52) U.S. Cl.
   CPC ............................. *F03B 13/00* (2013.01)
   USPC ................................................. 290/53

(58) Field of Classification Search
   CPC ..................................................... F03B 13/00
   USPC ................................................. 290/53
   See application file for complete search history.

(56) References Cited

U.S. PATENT DOCUMENTS

| 861,997 A | 7/1907 | Lück |
| 3,204,110 A * | 8/1965 | Masuda ......................... 290/42 |

(Continued)

FOREIGN PATENT DOCUMENTS

| DE | 3224894 A | 1/1984 |
| DE | 102006044563 A1 | 4/2008 |

(Continued)

OTHER PUBLICATIONS

Oskar Danielsson, "Design of a Linear Generator for Wave Energy Plant," Masters Thesis—Engineering Physics Programme at Uppsala University School of Engineering, Jan. 22, 2003.

(Continued)

*Primary Examiner* — Joseph Waks
(74) *Attorney, Agent, or Firm* — Devine, Millimet & Branch; Paul C. Remus; Kimberly A. W. Peaslee

(57) ABSTRACT

A system and method for generating energy from tuning the natural frequency of masses relative to a ground plane and an external three. In some embodiments the external three is the action of the waves. The system has a first mass movable relative to the ground plane, wherein the external force induces an oscillation in the first mass relative to the ground plane. A second movable mass is carried by and movable relative to the first movable mass. The second movable mass creates kinetic energy as the result of varying the position of the second movable mass relative to the first mass. The system adjusts or tunes the frequency of various components in relation to the natural frequency of the waves. The energy created by the relative motion can be converted to various forms of energy including electrical energy.

2 Claims, 40 Drawing Sheets

(56) References Cited

U.S. PATENT DOCUMENTS

| | | |
|---|---|---|
| 3,717,103 A | 2/1973 | Guderjahn |
| 3,837,287 A | 9/1974 | Lichtenberg |
| 4,009,396 A | 2/1977 | Mattera |
| 4,123,667 A | 10/1978 | Decker |
| 4,207,739 A | 6/1980 | Scarpi |
| 4,260,901 A * | 4/1981 | Woodbridge .................. 290/42 |
| 4,266,143 A | 5/1981 | Ng |
| 4,364,715 A | 12/1982 | Bolding |
| 4,392,061 A * | 7/1983 | Dubois et al. .................. 290/53 |
| 4,418,286 A | 11/1983 | Scott |
| 4,423,334 A | 12/1983 | Jacobi et al. |
| 4,497,173 A * | 2/1985 | Gillilan ........................ 60/495 |
| 4,719,158 A | 1/1988 | Salomon |
| 5,347,186 A | 9/1994 | Konotchick |
| 5,552,657 A * | 9/1996 | Epstein et al. ................ 310/339 |
| 5,710,464 A | 1/1998 | Kao et al. |
| 6,647,716 B2 | 11/2003 | Boyd |
| 6,831,373 B1 | 12/2004 | Beaston |
| 7,003,947 B2 | 2/2006 | Kanki |
| 7,105,939 B2 | 9/2006 | Bednyak |
| 7,288,860 B2 | 10/2007 | Cheung et al. |
| 7,755,224 B2 | 7/2010 | Beane |
| 7,989,975 B2 * | 8/2011 | Clement et al. ................ 290/53 |
| 8,264,093 B2 | 9/2012 | Moore |
| 2002/0157398 A1 * | 10/2002 | Boyd ............................ 60/721 |
| 2003/0116971 A1 | 6/2003 | Likitcheva |
| 2004/0007880 A1 | 1/2004 | French |
| 2007/0116565 A1 | 5/2007 | Beane |
| 2007/0228736 A1 | 10/2007 | Smushkovich |
| 2007/0261404 A1 | 11/2007 | Stewart et al. |
| 2009/0160191 A1 | 6/2009 | Beane |
| 2009/0315431 A1 | 12/2009 | Rastegar |
| 2009/0322080 A1 | 12/2009 | Minguela et al. |
| 2011/0089689 A1 * | 4/2011 | Gregory ........................ 290/42 |

FOREIGN PATENT DOCUMENTS

| | | |
|---|---|---|
| FR | 2375463 | 12/1976 |
| FR | 2480361 A | 10/1981 |
| FR | 2504986 A * | 11/1982 |
| FR | 2523654 A1 | 9/1983 |
| FR | 2911927 | 11/2007 |
| GB | 1562174 | 3/1978 |
| JP | 2009216076 A | 9/2009 |
| SE | 9402887 | 3/1996 |
| SU | 587570 A * | 1/1978 |
| SU | 1363393 A | 12/1987 |
| WO | 0223039 | 3/2002 |
| WO | 2010071706 | 6/2010 |

OTHER PUBLICATIONS

ISA/US, PCT/US2009/059531, Apr. 13, 2010.
ISA/US, PCT/US2011/001368, Jan. 27, 2012.
ISA/US, PCT/US2011/001369, May 30, 2012.
U.S. Appl. No. 11/593,895, Nov. 7, 2006, Abandoned.
U.S. Appl. No. 12/079,591, Mar. 27, 2008, Patented.
U.S. Appl. No. 12/316,772, Dec. 15, 2008, Pending.
U.S. Appl. No. 12/850,340, Aug. 4, 2010, Patented.
U.S. Appl. No. 12/850,371, Aug. 4, 2010, Pending.

* cited by examiner

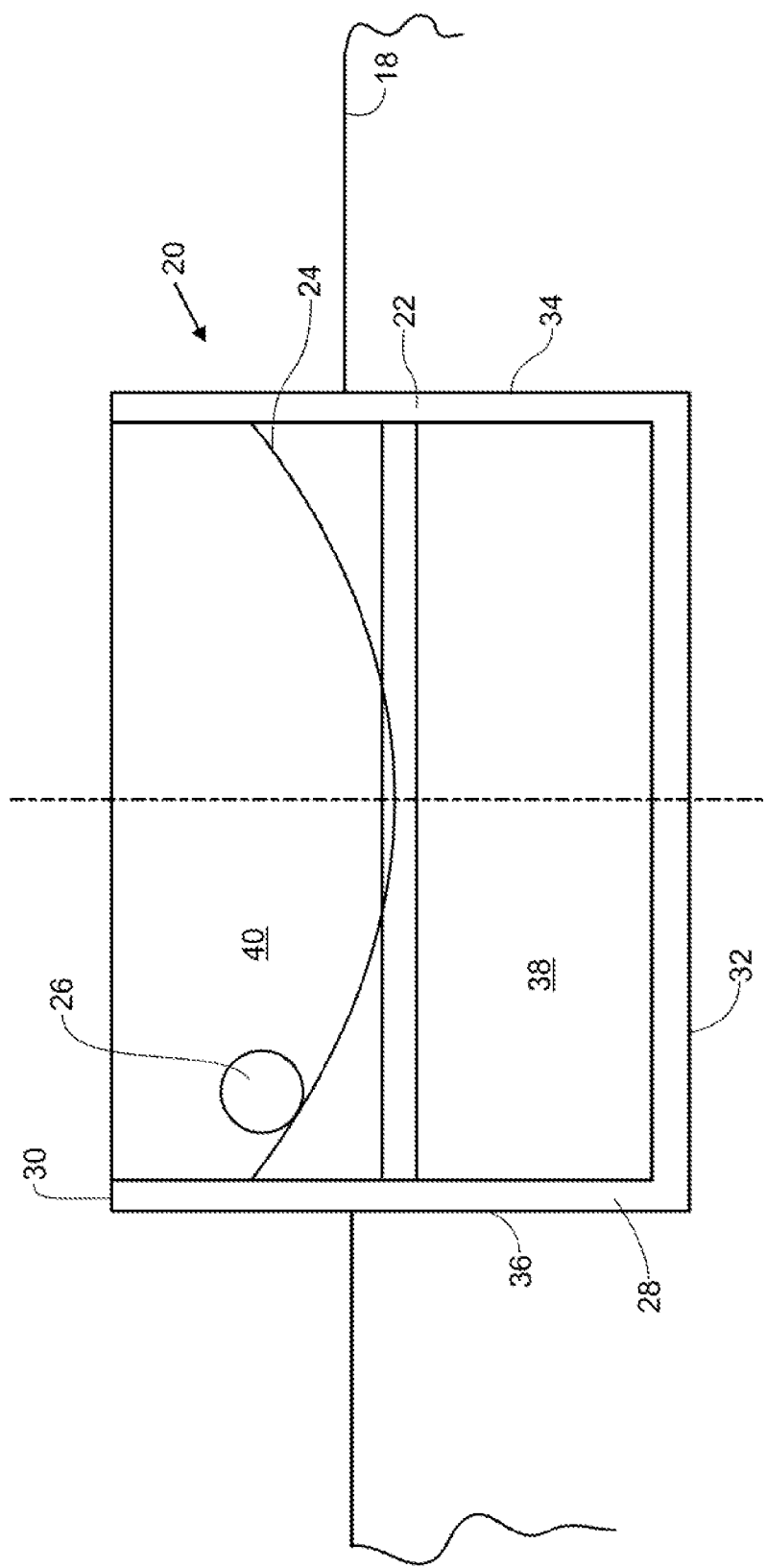

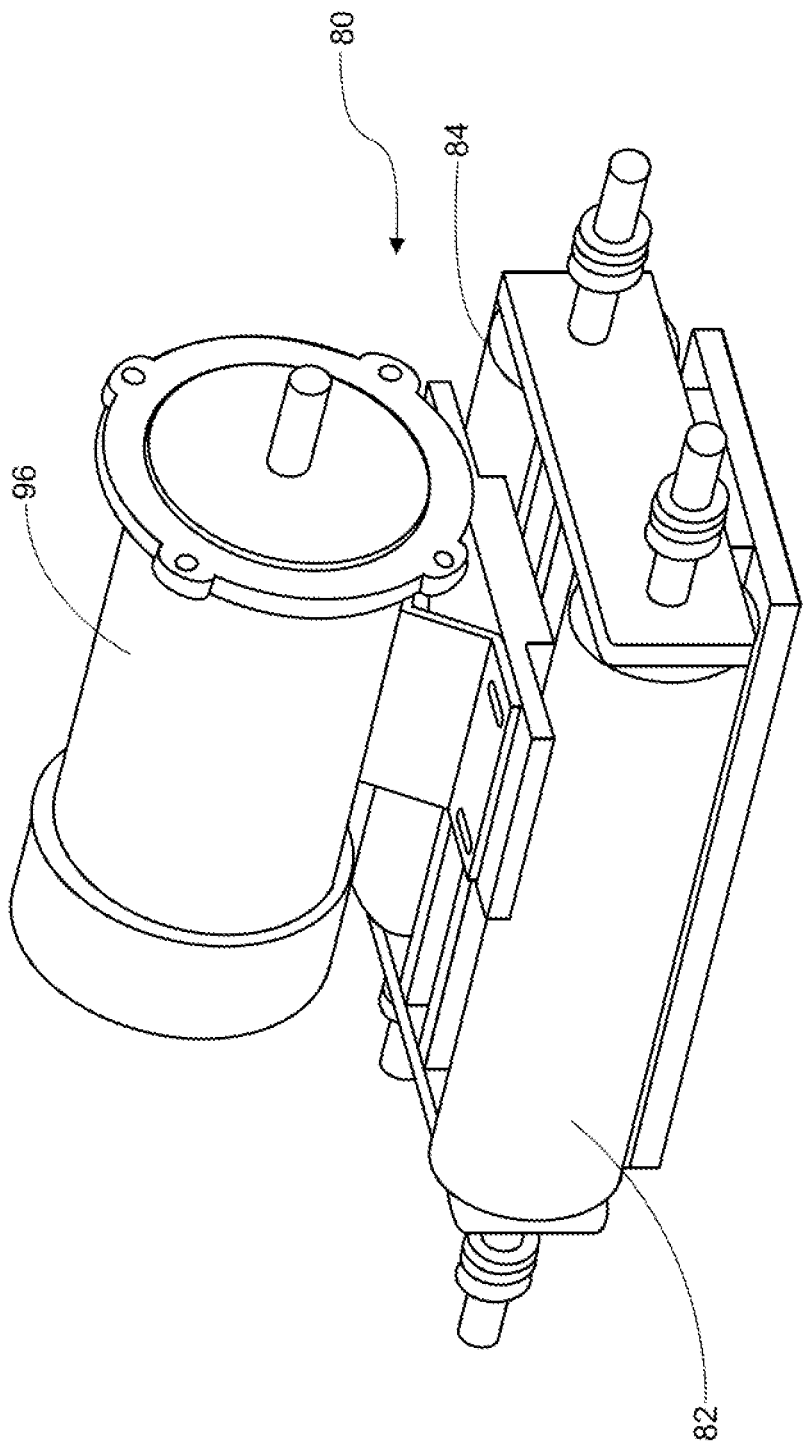

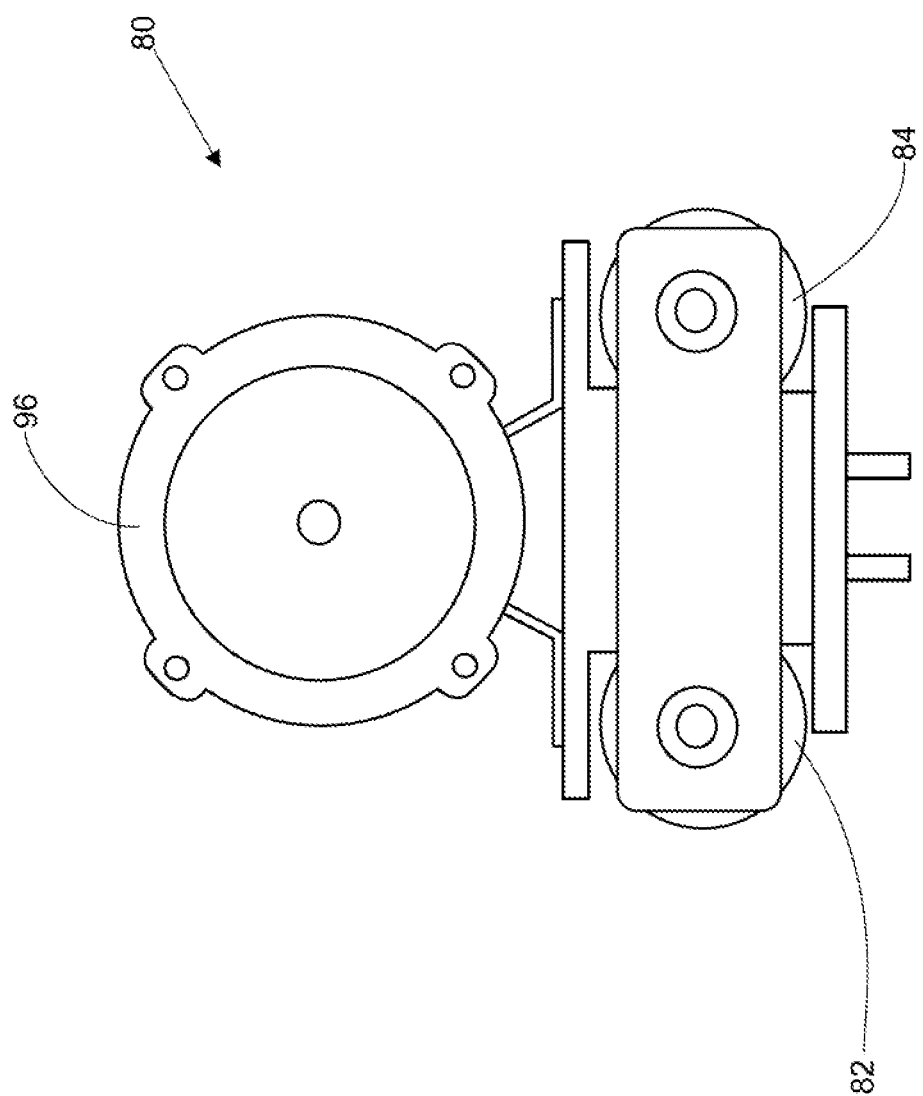

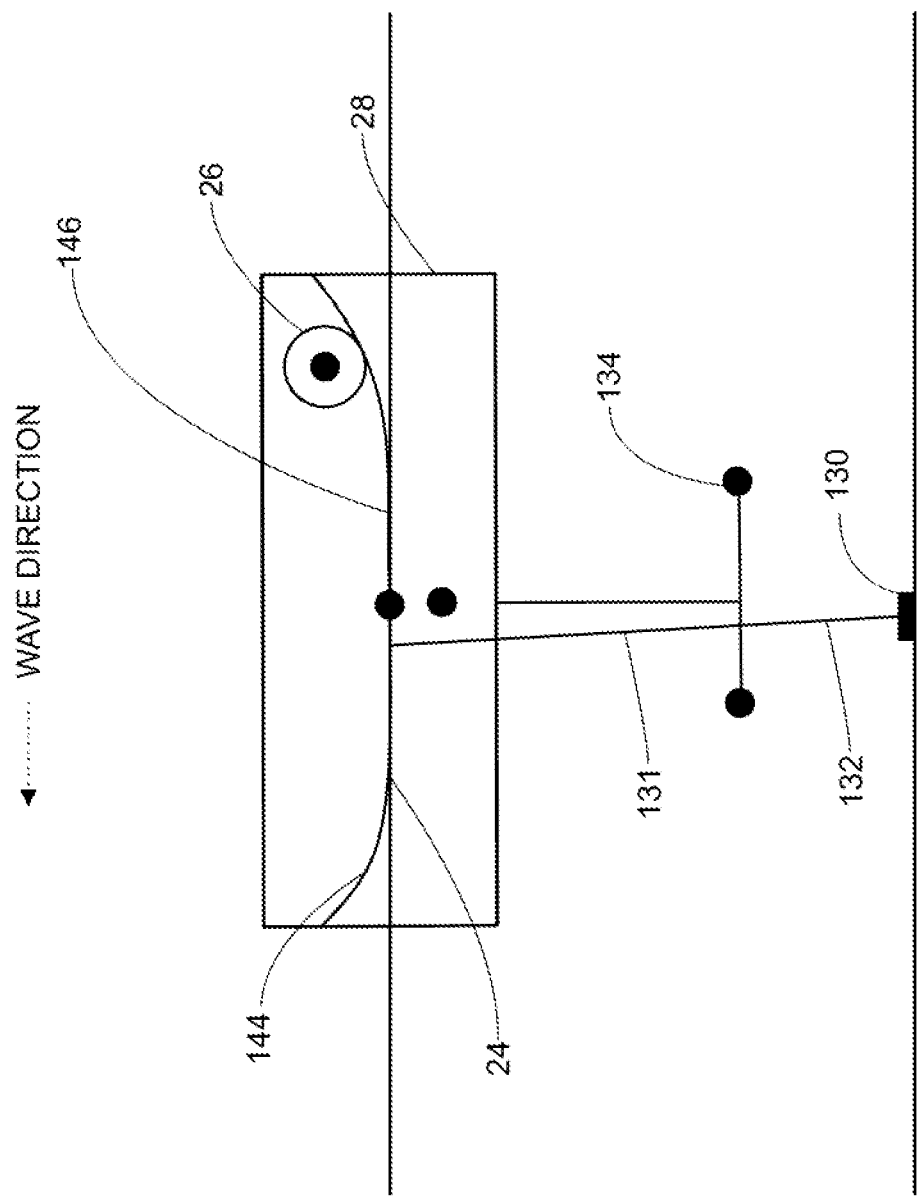

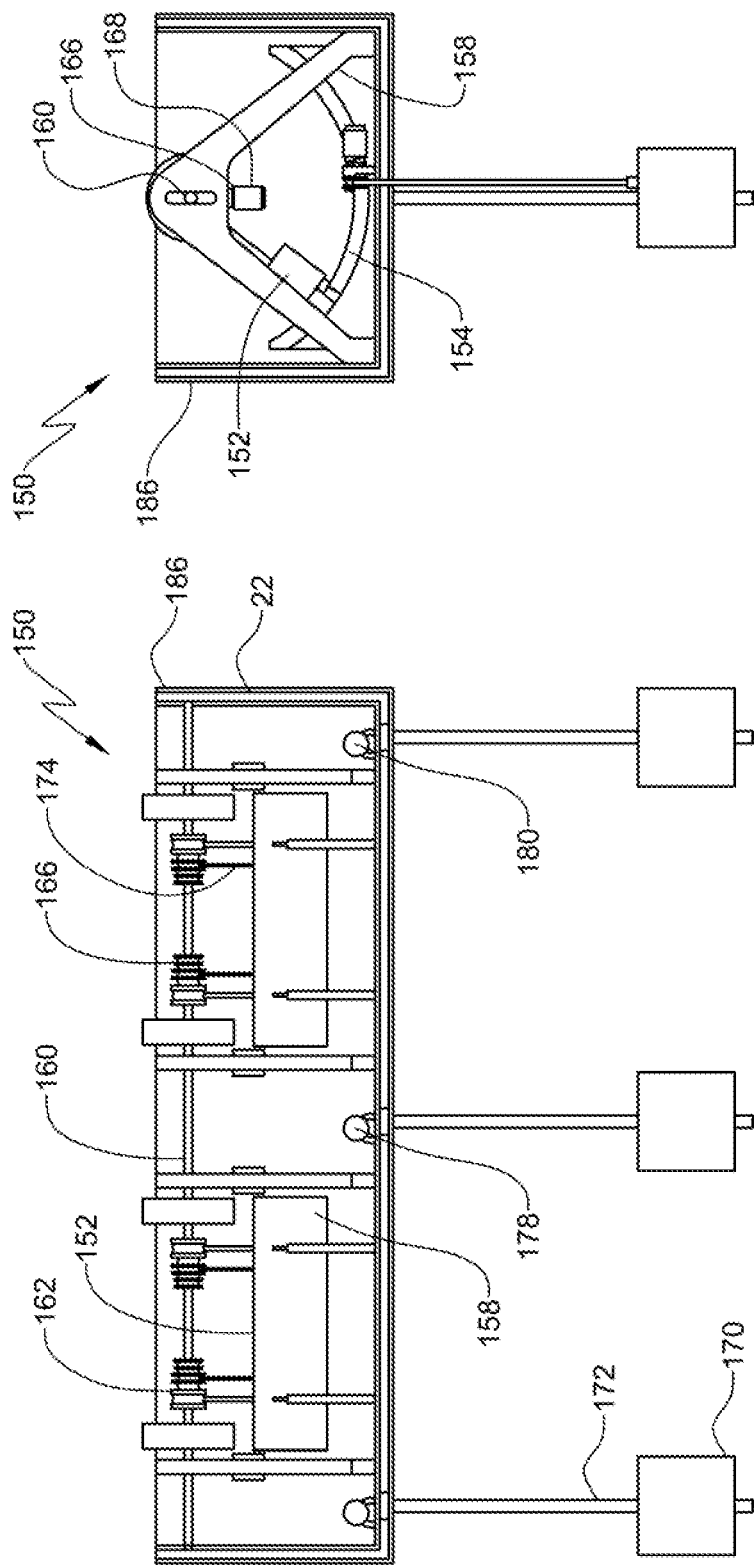

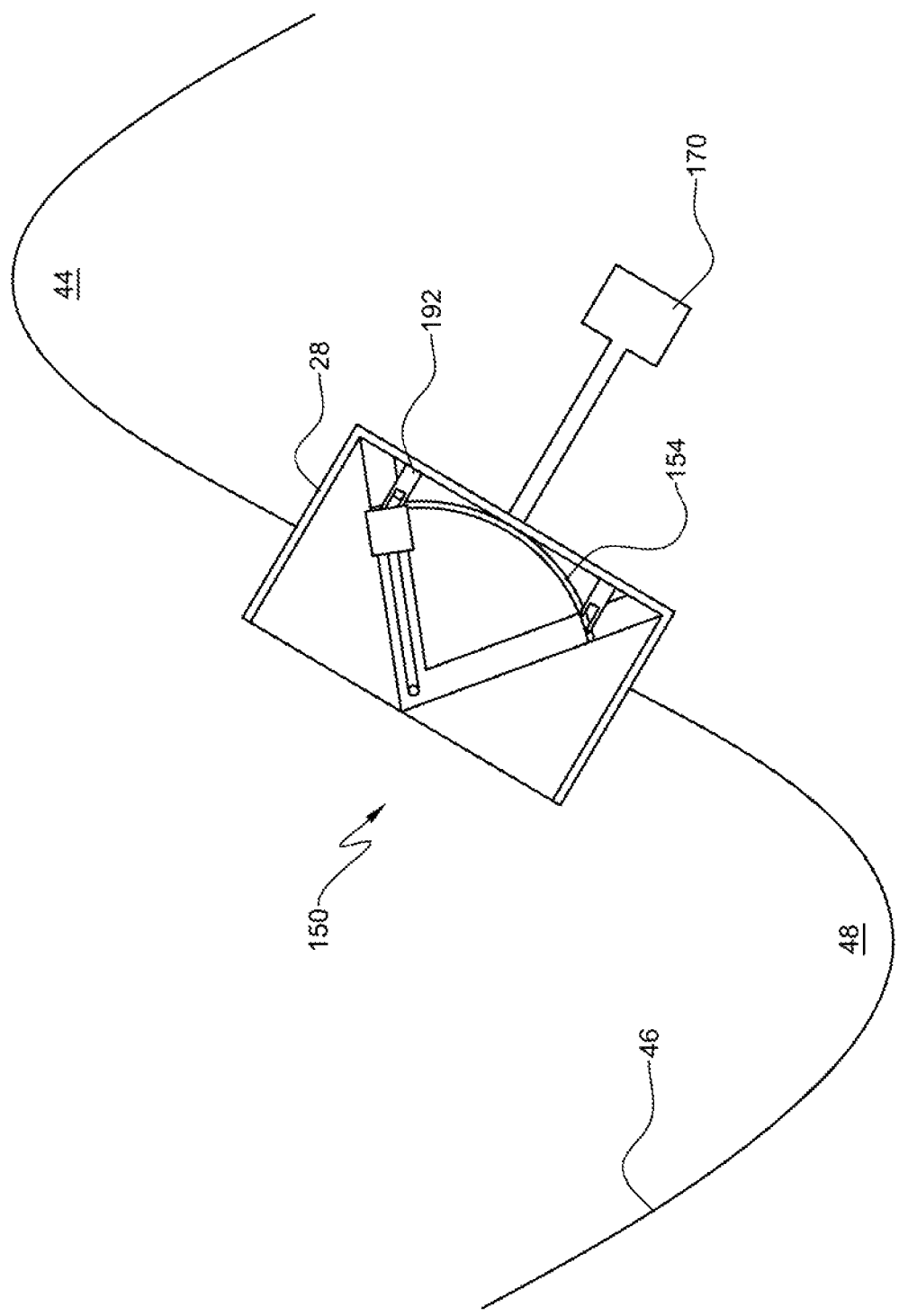

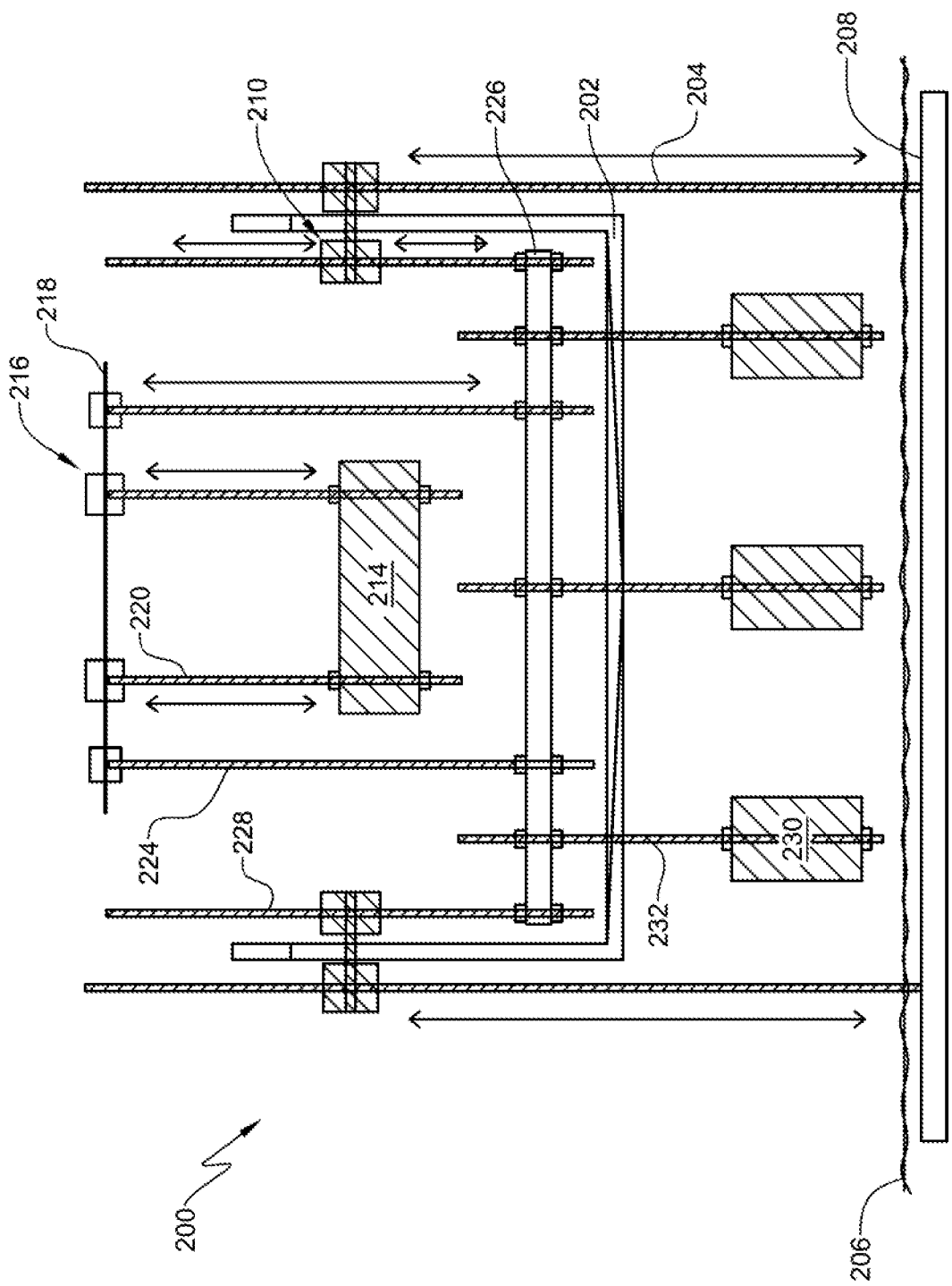

SYSTEM FOR PRODUCING ENERGY THROUGH THE ACTION OF WAVES

CROSS-REFERENCE TO RELATED APPLICATIONS

This application is a continuation of U.S. patent application Ser. No. 12/850,340 filed on Aug. 4, 2010, which is a continuation-in-part of U.S. patent application Ser. No. 12/316,772 filed on Dec. 15, 2008, which is a continuation-in-part of U.S. patent application Ser. No. 12/079,591 filed on Mar. 27, 2008, now issued U.S. Pat. No. 7,755,224 issued Jul. 13, 2010, which is a continuation-in-part of abandoned U.S. patent application Ser. No. 11/593,895 filed on Nov. 7, 2006, which claims the benefit of U.S. Provisional Patent Application 60/734,203 filed on Nov. 7, 2005, all of which are incorporated herein by reference.

FIELD OF THE INVENTION

The present invention is a system and method for producing electricity. More particularly, it is a system and method fig producing electricity through the action of waves on platforms.

BACKGROUND OF THE INVENTION

There are numerous approaches to producing electricity from the hydraulic force of the localized movement of water in large bodies of water. Water moving as a result of tides, winds, or gravity, for example, has been used as a hydraulic force to move some turbine, door, or other part of a larger apparatus anchored to land. This approach is expensive, not very efficient, and prone to breaking down both because of the difficulty in anchoring the apparatus to land and because the ocean is corrosive and small sand particles in the ocean cause excessive wear.

The power density of wind and water, two abundant natural resources, is very low. It is not until wind is blowing in excess of 100 MPH that it will blow a standing person over, and if a person is floating in even large ocean waves the three of the waves flows by you because water is a low-density liquid. One can feel the energy of the wave, but the force is minimal as compared to standing in the road and being hit by a bus traveling at the same speed as the wind or water. Force equals the density of an object multiplied by the speed that it is traveling, so very low-density substances like wind and water do not make very good energy resources because the scale of energy projects for wind and water have to be extremely large and expensive and can also have extensive environmental impact on our planet, such as large hydro projects.

The solution to creating bountiful, renewable, non-carbon producing, cheap energy for our planet is to figure out a way to generate high power density energy like that of a coal fired or nuclear power plant using low-density wind and/or water, the most plentiful resources on our planet.

Unfortunately, prior attempts to produce electrical power from waves have failed to appreciate the various degrees of freedom involved and therefore have been inefficient. Furthermore, some systems have been unstable with components diverging even in relatively calm sea states.

SUMMARY OF THE INVENTION

The present invention is a system and method for producing electricity through the action of waves and tuning masses relative to a ground plane. A floating platform, a hull, and other components form a first mass that is movable relative to the ground plane. The external force, the oscillation of the waves, induces an oscillation in the first mass relative to the ground plane. A second movable mass is carried by and movable relative to the hull. The second movable mass creates kinetic energy as the result of varying the position of the second movable mass relative to the hull. A mechanism converts the kinetic, energy of the second mass moving relative to the first mass into electricity in an embodiment. The system tunes the second mass relative to the hull by various components to increase energy generated.

In an embodiment, a system for generating energy from a pendulum includes a base having a mounting point and a curved surface. The pendulum has a connection point and curved surface spaced from the connection point. The connection point of the pendulum is pivotably mounted to the mounting point of the base. The system has an energy extraction system having a pair of complementary energy extraction devices including a magnetic field device and a coil device wherein the movement of the magnetic field device relative to the coil device creates a flow of current in the coil device. The magnetic field device is carried by one of the curved surfaces. The coil device is carried by the other of the curved surfaces.

In an embodiment, the base is movable relative to the waves in a body of water, wherein the water in the waves exerts hydraulic threes on the base. The pendulum is tunable for tuning a natural frequency of the pendulum relative to a wave natural frequency if the wave to increase the energy generated and control the energy generated.

In an embodiment, the base has a floating platform having a portion that displaces a portion of the body of water. The base and a plurality of components form a first movable mass; the pendulum carries a second movable mass. The second movable mass and the first movable mass have weight; the Archimedes' Principle allows the increase in the weight of the second movable mass by increased displacement therein increasing the power density and energy.

In an embodiment, the base and at plurality of components form a first mass; the pendulum carries a second mass. The first mass has a first natural frequency that is tunable relative to the wave natural frequency of the wave. The second mass has the pendulum natural frequency, a second natural frequency, that is tunable relative to the first natural frequency and the wave natural frequency. The system also has an active tuning system for adjusting the tuning of at least one of the masses as the masses move relative to each other and the body of the water.

In an embodiment, the magnetic field device is carried by the pendulum. The coil device is carried by the curved surface of the base. The coil device has a plurality of coils that are separate and distinct and capable of having a flow current created.

In an embodiment, the curved surface of the base is at least one track having one of the complementary energy extraction devices. The pendulum has a mounting device that engages the track. The mounting device has a curved surface wherein the mounting device has the other of the complementary energy extraction devices.

In an embodiment, the curved surface of the base has at least a pair of tracks having one of the complementary energy extraction devices. In an embodiment, the curved surface of the base is a portion of the sphere. The pendulum is connected to the connection point such that the pendulum may rotate out of plane. In an embodiment, the pendulum is capable of rotating 360 degrees. In an embodiment, the connection point of the pendulum is a magnetic hearing.

In an embodiment, a system for generating energy from a platform tuned relative to waves in a body of water uses the hydraulic force of the waves in a body of water. The system includes a platform having a curved surface. A pendulum of the system has a connection point carried by the platform and an end point. The pendulum has a tunable mass movable relative to the platform. The end point and the tunable mass are capable of moving along as curved path defining a curved surface. The system has an energy extraction system having a pair of complementary energy extraction devices including a magnetic field device and a coil device. The movement of the magnetic field device relative to the coil device creates a flow of current in the coil device. The magnetic field device is carried by one of the curved surfaces. The coil device is carried by the other of the curved surfaces.

In an embodiment, the curved surface of the platform includes at least one rail carrying one of the complementary energy extraction devices. The end point of the pendulum has at least one guide moving along the at least one rail. The at least one guide carries the other of the complementary energy extraction devices.

In an embodiment, the platform includes a hull and a counterbalance mass. The counterbalance mass is adjustable in position relative to the hull.

In an embodiment, the platform and a plurality of components form a first movable mass; the pendulum carries a second movable mass. The first movable mass has a first natural frequency that is tunable relative to a wave natural frequency of the wave. The second movable mass has a second natural frequency that is tunable relative to the first natural frequency and the wave natural frequency. The system has an active tuning system for adjusting the tuning of at least one of the masses as the masses move relative to each other and the body of the water.

In an embodiment, the floating platform has a portion that displaces a portion of the body of water. The second movable mass and the first movable mass have weight. The Archimedes' principle allows the increase in the weight of the second movable mass by increased displacement therein increasing the power density and energy.

In an embodiment, the active tuning system includes a plurality of ballast tanks in the platform. A mechanism moves ballast between the tanks for adjusting the tuning of the first movable mass as the masses move relative to each other and the body of the water.

In a method for generating energy from the movement of a pendulum, the method includes a pendulum having a connection point carried by a base. The pendulum is tuned by moving a tunable mass movable relative to the base. The system extracts energy from the movement of the pendulum relative to the platform wherein there is a pair of complementary energy extraction devices including a magnetic field device and a coil device. The movement of the magnetic field device relative to the coil device creates a flow of current in the coil device.

In an embodiment, a system for generating energy from a device tuned relative to waves in a body of water uses the hydraulic force of the waves in a body of water. The device is movable relative to the waves. The water in the waves exerts hydraulic forces on the device. A mechanism tunes a natural frequency of the device relative to a wave natural frequency of the wave to increase energy generated.

In an embodiment, a mechanism converts the kinetic energy of the device into another form of energy. In an embodiment, the waves exert force directly on the device. In an embodiment, the device is a floating platform having at least one tunable device.

In an embodiment, the at least one tunable device includes a counterbalance mass located below the floating platform and adjustable in position related to the floating platform.

In an embodiment, the platform and a plurality of components form a first movable mass. The system includes a pendulum carrying a second movable mass. The first movable mass has a first natural frequency that is tunable relative to a wave natural frequency of the wave. The second movable mass that has a second natural frequency is tunable relative to the first natural frequency and the wave natural frequency. An active tuning system adjusts the tuning of at least one of the masses as the masses move relative to each other and the body of the water.

In an embodiment, the waves indirectly exert force on the device. In an embodiment, the device is a mass pivotably mounted to a floating platform.

These aspects of the invention are not meant to be exclusive and other features, aspects, and advantages of the present invention will be readily apparent to those of ordinary skill in the art when read in conjunction with the following description, appended claims, and accompanying drawings.

BRIEF DESCRIPTION OF THE DRAWINGS

These and other features and advantages of the present invention will be better understood by reading the following detailed description of embodiments, taken together with the drawings wherein:

FIG. 1 is a schematic diagram of a floating platform;

FIGS. 6B-6D are various views of the unit having, the masses;

FIG. 12 is a schematic diagram of the floating platform of FIG. 10 with various elements tuned;

FIG. 16 is a front sectional view of the floating platform of FIG. 15;

FIG. 17 is a side sectional view of the floating platform of FIG. 15;

FIGS. 19B-19D are schematics side views of the floating platform after tuning of a swinging mass with a braking mechanism;

FIG. 20 is a front sectional view of an alternative floating platform;

DETAILED DESCRIPTION OF EMBODIMENTS

Figure 2A:
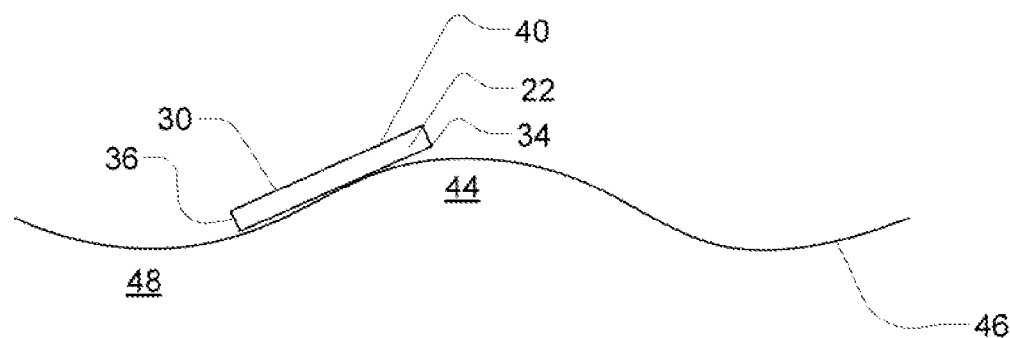
FIGS. 2A and 2B are schematic diagrams of the reverse incline planes produced by a wave.

Two-thirds of the earth's surface is covered with water. Three-fourths of the earth's population lives within close proximity to an ocean or other large body of water. All of these people need electricity.

The wind blowing on the surface of an ocean or other large body of water (hereinafter, collectively, the "Ocean") efficiently converts wind energy into wave energy. The present invention is a system for converting the energy of waves on the Ocean into low-cost, efficient, reliable, clean electricity.

A system and method of generating energy by transforming energy from a low-density substance, such as water, into kinetic energy by tuning, the oscillating motion of the two sets of masses. The energy to drive the tunable system is from the oscillating motion of the waves.

Referring to FIG. 1, a system 20 having a floating platform 22 on a body of water 18 without waves, a track 24, and a mass 26, a rolling energy generating mass, is shown. The floating platform 22 has a hull 28 including a top surface 30, a bottom surface 32, a leading edge 34, and a trailing edge 36. The hull has a buoyancy compartment 38 and an energy generating portion 40. The track 24 and the mass 26 are located in the energy generating portion 40 as explained in greater detail below.

Figure 2B:
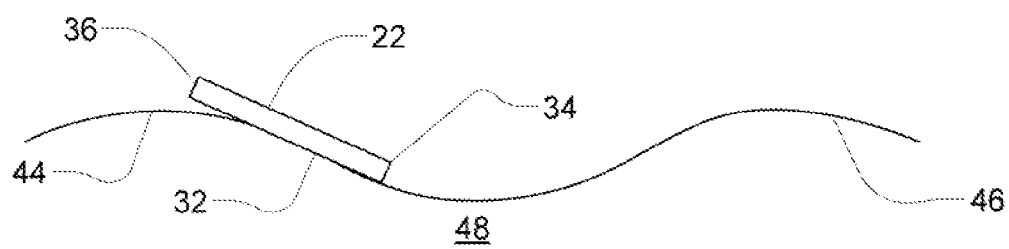

Wave energy can be converted into useful mechanical energy through the hydraulic fore of the water in a wave causing a floating platform 22 to act as a series of incline planes. Referring to FIGS. 2A and 2B, the floating platform 22 is shown in two positions relative to a crest 44 of a wave 46.

For simplification, the floating platform 22 is shown with the entire platform 22 above the water 18. It is realized that the platform 22 would be partially under the water because of buoyancy and displacement of water as explained below with respect to FIG. 10.

Still referring to FIG. 2A, the floating platform 22 is shown with the top surface 30, the bottom surface 32, the leading edge 34, and the trailing edge 36. As the crest 44 of a wave 46 reaches the leading edge 34 of the platform 22, the hydraulic force of the water raises the leading edge 34 relative to the trailing edge 36 creating an incline plane. As the crest 44 of the wave 46 passes under the platform 22, the hydraulic force of the water no longer raises the leading edge 34, which now falls into a trough 48 of the wave 46, relative to the trailing edge 36.

Referring to FIG. 2B, the leading edge 34 has fallen into the trough 48 relative to the trailing edge 36 of the floating platform 22. The hydraulic force of the water now raises the trailing edge 36 relative to the leading edge 34 creating another incline plane. For purposes of this description, an incline plane first with its leading edge higher than its trailing edge and then with its leading edge lower than its trailing edge, will be described as the reverse of each other. Thus, the action of the moving waves causes a series of incline planes, any given incline plane being the reverse of both the incline plane that precedes it and the incline plane that follows it.

Figure 3:
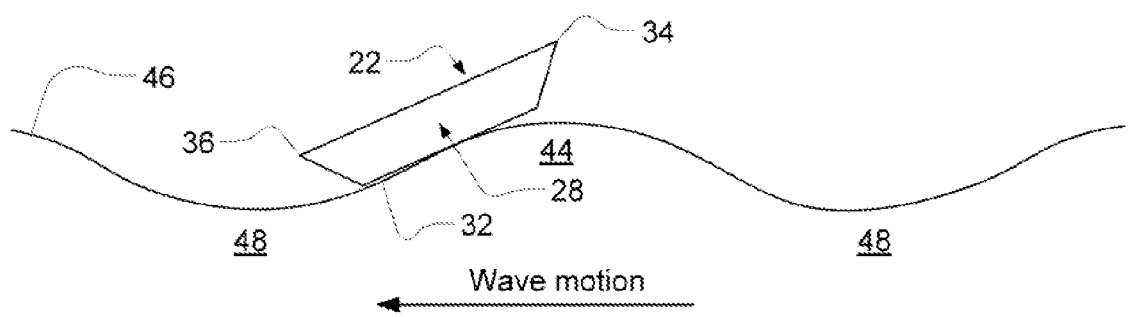
FIG. 3 is a schematic diagram of a ship incorporating one of the incline planes produced by a wave as shown in FIG. 2.

It should be noted that the floating platform 22 with a bottom 32 that is flat both in the direction of the motion of the waves and transverse to the motion of the waves, as opposed to rounded or v-shaped, is a more efficient incline plane. It should also be noted that the length of the incline plane formed by a floating platform from the leading edge 34 (bow) to the trailing edge 36 (stern) can be increased. One method is by raising the energy generating portion 40, which is shown as the top surface 30 of the platform 22 relative to the bottom surface 32 of the platform 22 with an angled hull, as would customarily be the case of the deck of a ship 22 relative to its hull 28, as shown in FIG. 3.

Figure 4A:
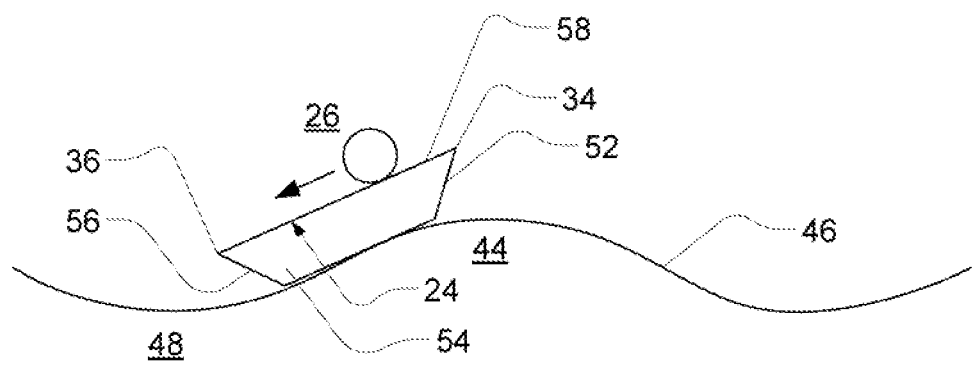
FIGS. 4A and 4B are schematic diagrams of a moving mass on the incline plane of the ship shown in FIG. 3.
Figure 4B:
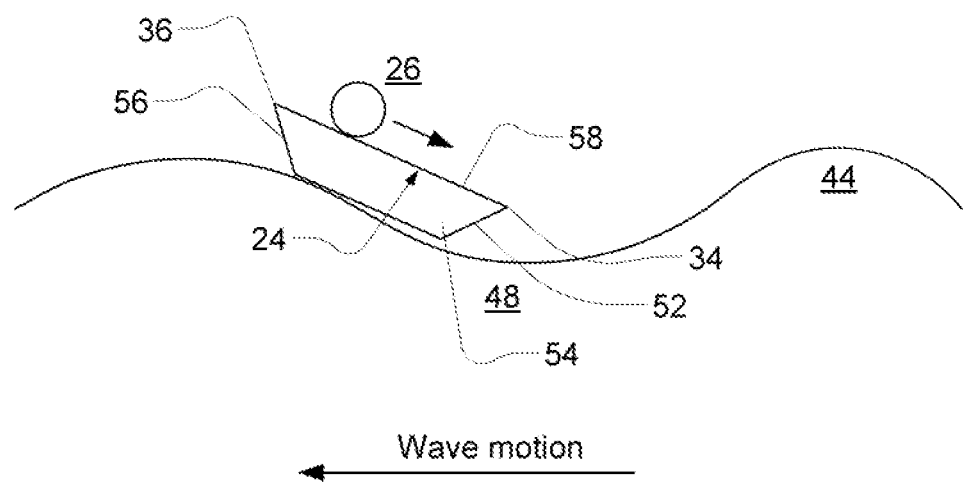

The energy of a series of moving waves is converted into mechanical energy through the movement of a mass down a series of reverse incline planes formed by the hydraulic force of the water in the waves on a ship's hull. As is discussed below, the mass may be solid or liquid and may take any one of a number of forms known to those skilled in the art. Referring to FIG. 4A, when the crest 44 of a wave raises the bow 52 of a ship 54 relative to the stern 56 (the trailing edge 36), it creates an incline plane 58 of the track 24. The force of gravity then causes the mass 26 to move down the incline plane 58 from the bow 52 to the stern 56. As the crest 44 of the wave 46 passes under the ship 54, the bow 52 of the ship 54 sinks relative to the stern 56 into the trough 48 of the wave 46 creating a reverse incline plane as shown in FIG. 4B. The three of gravity now causes the mass 26 to move down the reverse incline plane 58 of the track 24 from the stern 56 to the bow 52. It should be noted that a ship embodying these principles may be positioned transverse to the direction of the wave motion causing a mass to move down reversing incline planes from one side of the ship to the other.

The greater the mass 26 moving down the incline planes, the greater the mechanical energy created. It should be noted that this source of energy is renewable because the waves 46 continuously create reverse incline planes, causing the mass 26 to repeat continuously its motion from the bow to the stern and back to the bow.

The energy of the mass moving down the series of reverse incline planes is converted by known means into electrical energy using a generator. One ft. lb. of force per second equals 1.356 watts of electricity; so, the amount of force required to move 1.0 lb a distance of 1.0 ft. in 1.0 second is equal to 1.356 watts of electricity. As an example, 100,000 ft. lb. of force per second created by a mass moving down an incline plane equals 135,600 watts of electricity. Preferred embodiments of means for converting the mechanical energy of the moving waves to electrical energy are described below, but other means known to those skilled in the art are available.

Figure 5:
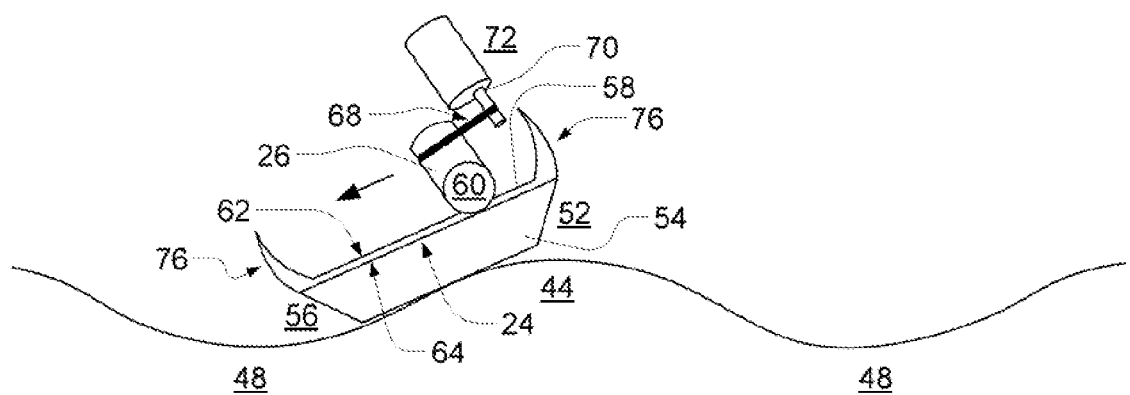
FIG. 5 is a schematic diagram of a rolling cylinder on the incline plane of the ship shown in FIG. 3.

Referring to FIG. 5, a cylinder 60 of a suitable, preferably dense solid material or a hollow cylinder filled with a suitable, preferably dense liquid is the mass 26 shown. The cylinder 60 rolls down the track 24 formed of rails 62 on the deck 64 of the ship 54. The rails 62 of the track 24 form the incline plane 58 from the bow 52 to the stern 56 of the ship 54. The rails 62 of the track 24 minimize friction by reducing the surface area rather than the cylinder 60 rolling on the larger surface of the deck which forms the incline plane 58, therein causing the cylinder 60 to roll faster, thereby creating more mechanical energy. Sprockets and chains or similar means not shown) can be used to prevent the cylinder 60 from sliding down the track 24 rather than rolling.

Still referring to FIG. 5, a belt drive 68 is fastened around the circumference of the cylinder 60 and attached to a shaft 70 of an electric generator 72. As the cylinder 60 rolls down the track 24, it turns the shaft 70 of the generator 72, producing electricity. The revolutions per minute of the cylinder 60 can be controlled by varying the diameter of the cylinder 60 and the shaft 70 of the generator 72, or by using gears and other means known to those skilled in the art.

As also shown on FIG. 5, when the cylinder 60 reaches the end of the incline plane 54, if it is still rolling, any residual mechanical energy can be temporarily stored by having the cylinder 40 roll up a radius 76 of the track 24 until it stops. When the incline plane 54 reverses, the mass 26 initially travels down the radius 76, releasing stored mechanical energy prior to rolling down the reverse incline plane. Alternatively, if the mass 26 is still rolling at the end of the incline plane 54, electricity can be generated through the use of a braking device (not shown), known to those skilled in the art, that co-generates electricity as it stops the mass 26.

Figure 6A:
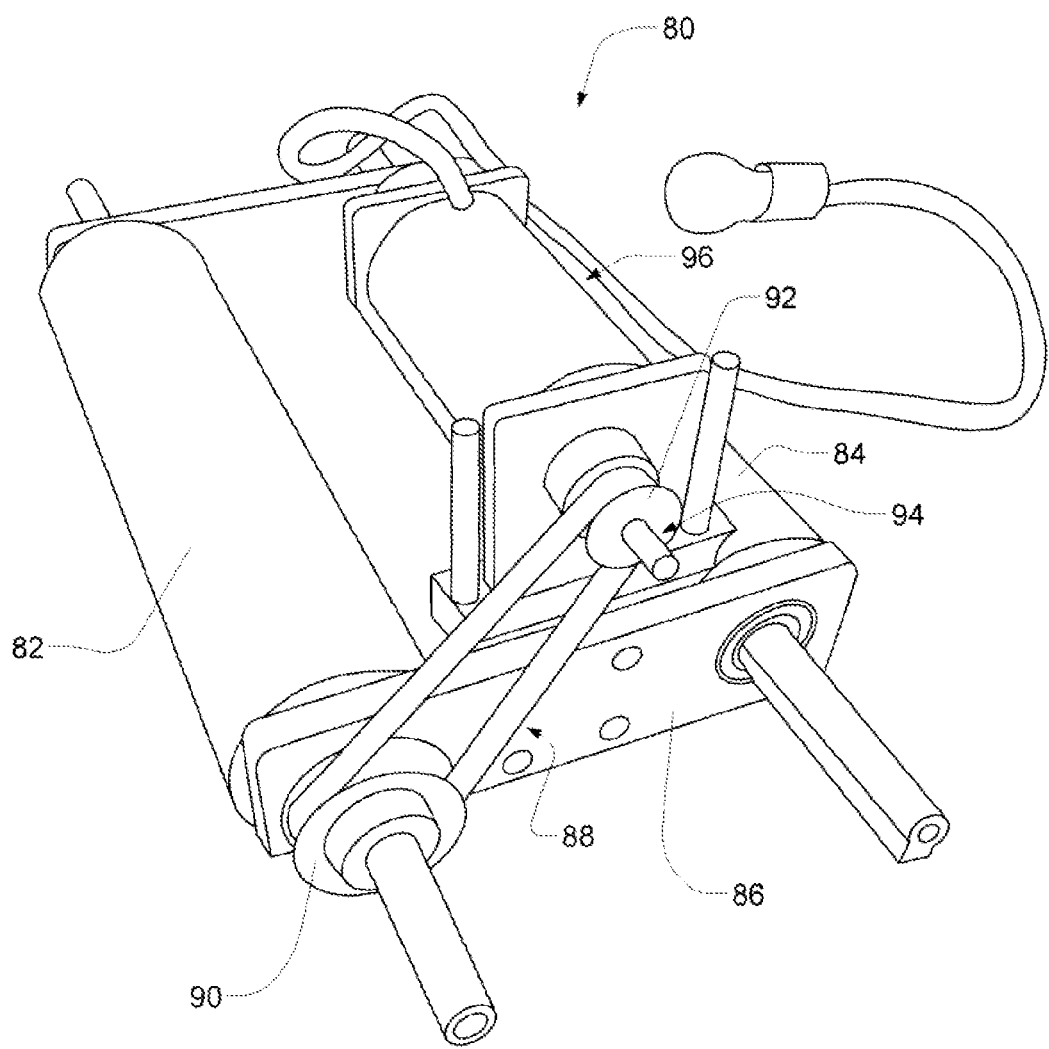
FIG. 6A is a diagram of a mass comprised of two substantially cylindrical masses.

Referring to FIG. 6A, the mass 26 is formed of a unit 80 having two substantially cylindrical masses 82 and 84 connected by a frame 86. A belt drive 88 is connected to a sprocket 90 on an extension of one of the cylindrical masses 82 and a sprocket 92 on a shaft 94 of an electrical generator 96. As the cylindrical masses 82 and 84 roll down the reverse track 24, such as in FIG. 5, the mass 82 turns the shaft 94 of the generator 96 producing electricity.

A prototype of the present invention, as shown in FIG. 6A comprises custom stainless steel construction of the cylindrical masses 82 and 84 and frame 86. The belt drive 88 and timing gear (not shown) were purchased from Stock Drive Products of New Hyde Park, N.Y., and the generator is a low RPM permanent magnet DC generator purchased from Windstream Power, LLC of North Ferrisburgh, Vt.

Figure 6D:
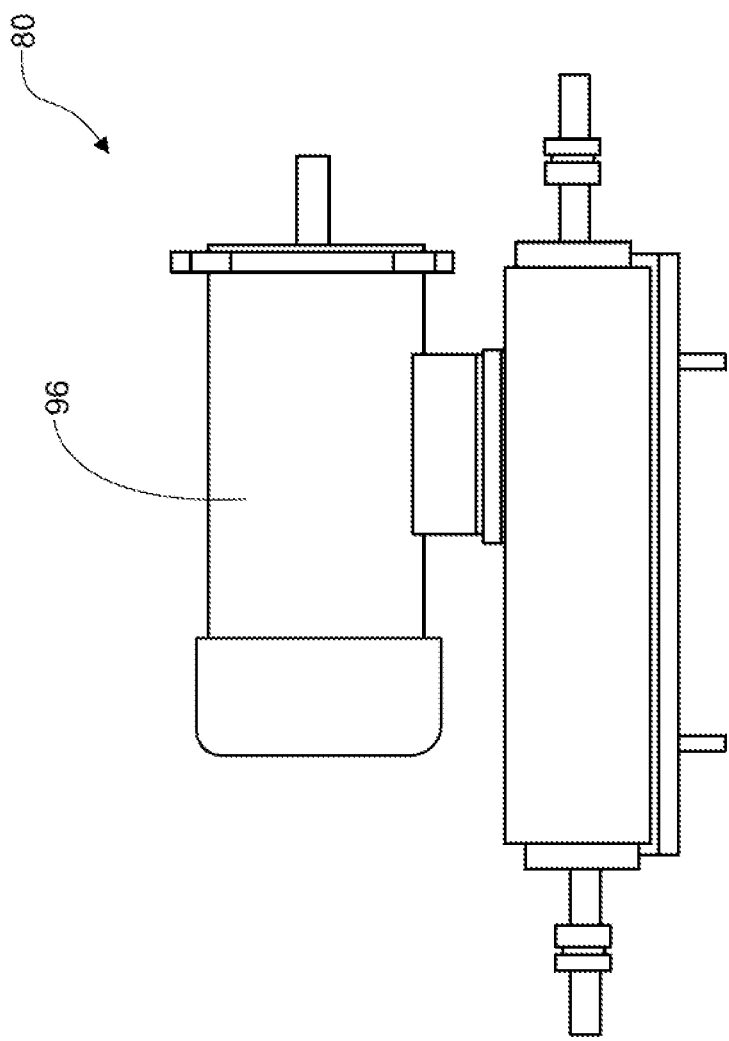

Referring to FIGS. 6B-6D, the unit 80 with the cylindrical masses 82 and 84 are shown.

Electricity generated by the present invention can be stored, for example in batteries, on the ship on which it is produced or can be transmitted concurrently with its production through underwater cables to the power grid.

Figure 7:
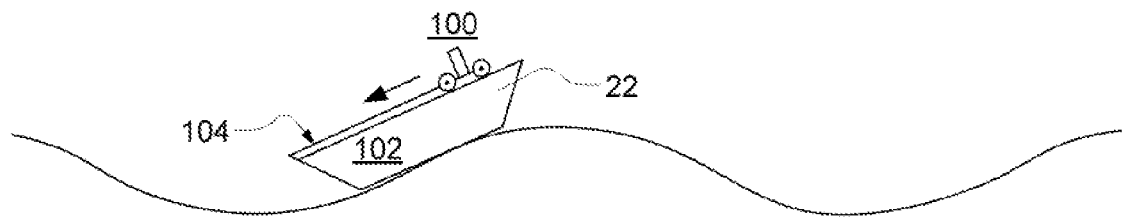
FIG. 7 is a schematic diagram of a rolling wheeled vehicle on the incline plane of the ship shown in FIG. 3.

Another preferred embodiment is shown in FIG. 7. In this embodiment, a wheeled vehicle 100 rolls down an incline plane 102 on a track 104. The mechanical energy of the moving vehicle is converted to electricity by driving the shaft of an electric generator with a belt (not shown) attached to the axles or wheels of the wheeled vehicle 100. Alternatively, although it is not as efficient, the linear motion of the wheeled vehicle 100 can be converted into rotary motion to drive an electric generator via a screw drive or other means known to those skilled in the art. This approach also allows the generator to be fixed to the platform 22, as opposed to the embodiments shown in FIGS. 5 and 6 in which the generator is fixed to the moving mass 26. It should be clear that, in practice, one or more moving masses can drive one generator or one moving mass can drive one or more generators.

Figure 8:
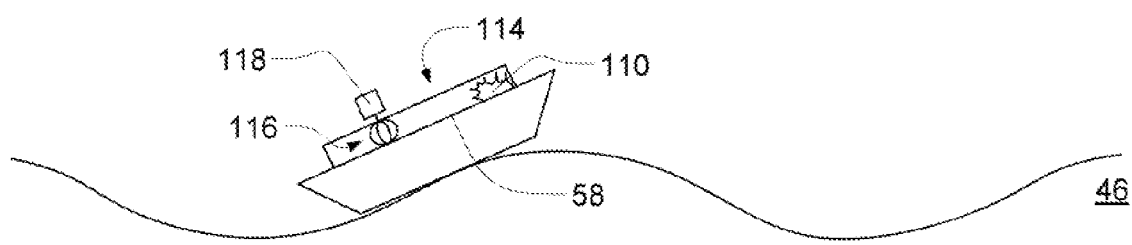
FIG. 8 is a schematic diagram of a moving liquid on the incline plane of the ship shown in FIG. 3.

In still another preferred embodiment, as shown in FIG. 8, a volume of a suitable liquid 110, such as water, can be used to flow down an incline plane 58. The flowing water 110 is diverted through a duct, pipe, or other channel 114 to a turbine 116. The flowing water drives the turbine 116 which, in turn, drives a generator 118. Various means known to those skilled in the art, such as separate channels, can be used to insure that the turbine is turned in the same direction by the flowing water regardless of the direction of the flow of the water as it flows down a series of reverse incline planes.

Figure 9:
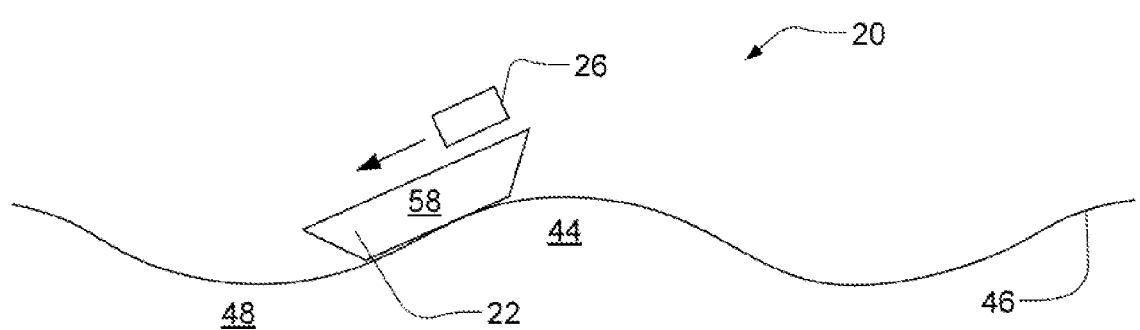
FIG. 9 is a schematic diagram of an electromagnetically suspended mass on the incline plane of the ship shown in FIG. 3.

In still another embodiment, as shown in FIG. 9, a mass 26 can be suspended above an incline plane 58 by electromagnetic force. This will eliminate friction between the mass 26 and the incline plane 58. As the mass 26 moves down the incline plane, various means described above or known to those skilled in the art can be used to convert the mechanical energy of the motion into electricity.

Figure 10:
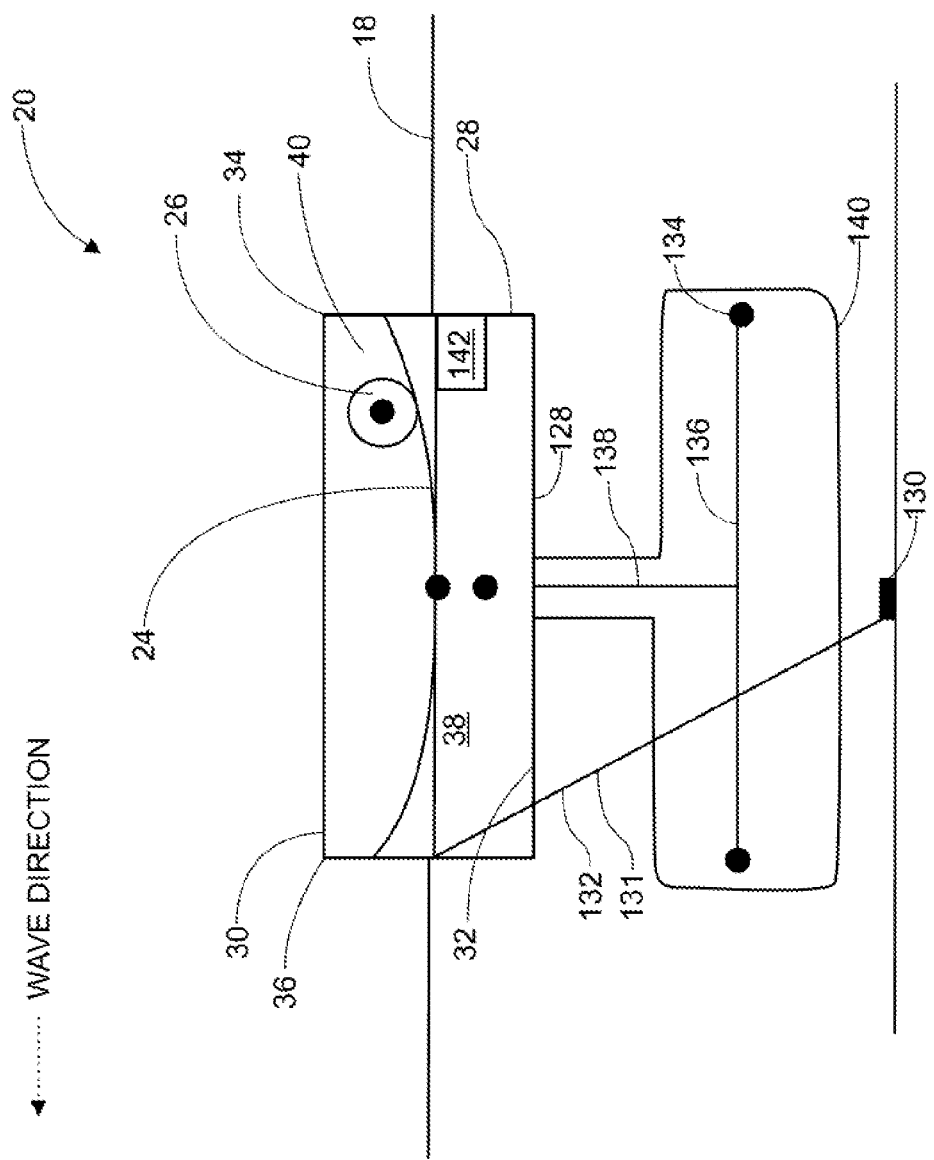
FIG. 10 is a schematic diagram of an alternative embodiment of the floating platform.

Referring to FIG. 10, an alternative floating platform 128 of the system 20 is shown in a body of water 18 without waves. The floating platform 128 has a track 24 and a mass 26, a rolling energy generating mass, which follows the track 24. The floating platform 128 has a hull 28, including the top surface 30, the bottom surface 32, the leading edge 34, and the trailing edge 36. The hull 28 has a buoyancy compartment 38 and an energy generating portion 40. In addition, the system 20 has a mooring anchor 130. It is attached to the trailing edge 36 of the floating platform 128 by a mooring line 132. In addition, the system 20 has a pair of tuning masses 134 along a tunable bar 136 located below the floating platform 128. The tunable bar 136 hangs below the bottom surface 32 of the floatable platform 128 by a line 138. The tunable masses 134 can be varied along the length of the tunable bar 136 to vary the moment of inertia of the tunable masses 134 in relation to the floatable platform 128. In addition, the tunable masses 134 can be moved up and down relative to the bottom surface 32 of the hull.

The tunable masses 134 can be part of a keel system 140. In contrast to keels on sailing boats where the mass is shifted outboard in the port and starboard direction that is along the beam, the tuning masses 134 extend in the direction of the wave that is the length of the floating platform.

Still referring to FIG. 10, in addition to the tunable masses 134, the system 20 is tunable in that the track 24 has a variable radius. The radius of the track can be adjusted to tune the track, and, therefore, the system 20 to the waves 46, such as shown in FIG. 11A.

The system 20 has a controller 142, in one embodiment that monitors various parameters including wave height and frequency. The controller has a computer or microprocessor and various input devices such as accelerometers, power meters, and global coordinate monitors. The controller 142 then is able to adjust items in the system 20 such as the location of the tunable masses 134 or the radius of the track 24 to adjust the system 20.

Figure 11A:
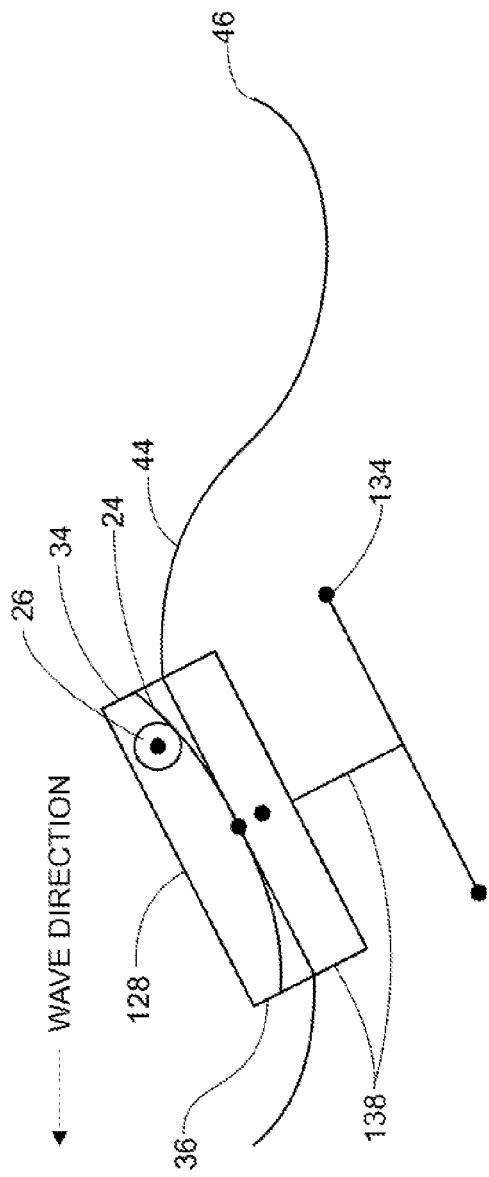
FIGS. 11A and 11B is a schematic diagram of the floating platform of FIG. 10 on a wave.

Referring to FIG. 11A, the floating platform 128 of FIG. 10 is shown on as wave 46 such that the leading edge 34 is near the crest 44 of the wave 46. Dependent on the size of the waves as defined as the height between the crest 44 and the trough 48, that the floating platform 128 is going to be used, the radius of the track 24 can be adjusted. A different radius of the track is shown in FIG. 12.

Figure 11B:
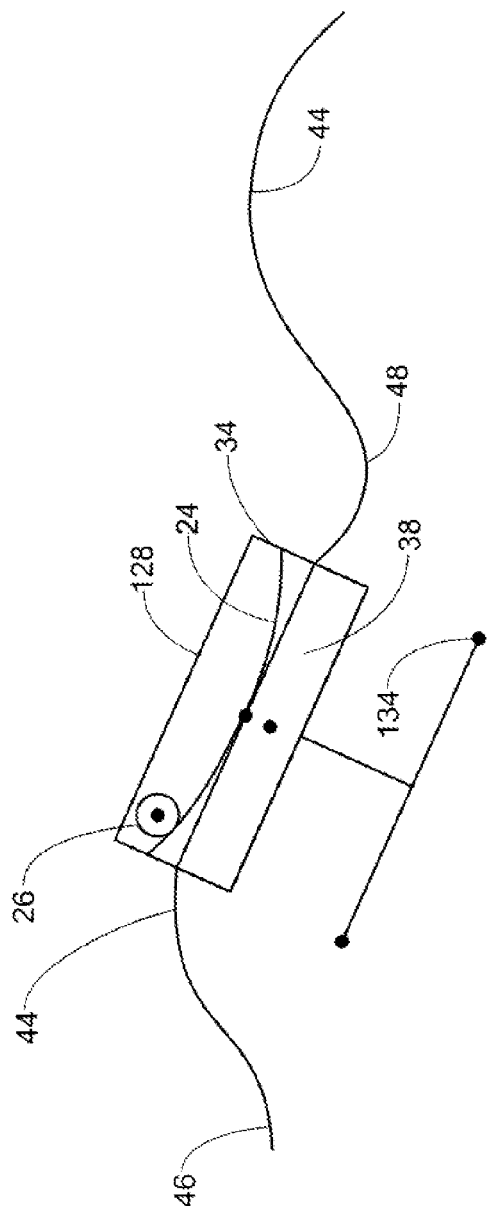

FIG. 11B shows the floating platform 128 on a wave 46 such that the trailing edge 36 is near the crest 44 of the wave 46 and the leading edge 34 is near the trough 48. The constant changing of the relative heights of the track 24 near the leading edge 34 and the trailing edge 36 of the floating platform 128 by the hydraulic force of the wave is the source of energy used to allow the mass 26, the rolling energy generating mass, to roll along the track 24 and generate power.

The mechanism or system 20 is designed so that the natural frequency of each primary component of the dynamic system, the mass 26/track 24 and the hull 28 geometry can be optimally tuned, like a musical instrument, to work with the natural frequency of ocean waves 46 to maximize the creation of energy, power. Referring to FIG. 12, the floating platform 128 of FIG. 10 is shown with various elements tuned for a wave 46. The radius of the track 24 has been adjusted therein varying the natural frequency of the mass 26/track 24. The radius of the track 24 can be changed by adjusting the track 24 or moving the radius of the curved portion 144 by lengthening or shortening a linear portion 146. In addition, the tunable masses 134 have been moved inward and the location of the mooring line 132 that is secured to the hull 28 has been moved to adjust the natural frequency of the hull 28.

A series of tests have been done using computer modeling. The model was done based previous modeling done in water tank and other real test data. The following are examples from the tests where the values have been scaled to real world numbers.

The hull 28 is designed for maximum stability and incorporates a "preload" feature. The mass 26, the rolling energy geometry mass, weighs 1,000,000 pounds in these tests. The hull 28 has to be stable enough to support the mass 26 at the fore and aft positions of the hull 28, and the leading and trailing edges 34 and 36. Stability is created by designing a hull 28 with enough draft to displace a volume of water that weighs equal to or is much larger than the weight of the mass 26 plus the total weight of the hull 28. As the ratio of volume of water displaced by the hull 28 to the weight of the mass 26 increases, the stability of the hull 28, metacentric height (GM), increases. Example: if the mass 26 weighs 1,000,000 pounds and a hull 28 is designed with enough draft to displace 2,000,000 pounds of water, the tunable masses 134 combined for a weigh of 2,000,000 pounds and will "Preload" the system with 2,000,000 pounds of force. The natural, frequency of the hull 28 geometry can be tuned by adjusting, vertically and horizontally, the position of the tunable masses 134 in relation to the bottom of the hull or to the waterline.

The hull 28 is designed with a reserve buoyancy feature or freeboard. As the hull pitches fore and aft, the reserve buoyancy is used do add additional buoyancy to the hull, adding to the "Preload" force.

The natural frequency of the mass 26 can be tuned by adjusting the radius of the mass 26 track, the diameter of mass 26, and the length amass 26.

The hull geometry is designed for a low moment of inertia. This means that the length of the hull should be much shorter than the beam of the hull. Think of a figure skater spinning with arms extended. As the figure skater's arms move inward the skater's moment of inertia decreases and the skater spins faster for any given amount of energy. As the hull's moment of inertia decreases, more of the stored "Preload" energy is available to the system and more power can be generated.

It is recognized that the ocean, the water 18, cannot be tuned. Therefore, the properties of the waves 46 are monitored including the period of the wave and the wave height. The height of the water is also monitored. While several items can be tuned as discussed above, in one embodiment of a scaled model, the properties in the Table 1 were run.

| Type of property | Property | Value |
|---|---|---|
| Hull Geometry | Length (ft) | 40.0 |
| Hull Geometry | Beam (ft) | 100.0 |
| Hull Geometry | Depth (ft) | 27.52 |
| Hull Geometry | Draft (ft) | 13.76 |
| Hull Geometry | Pitch Natural Frequency (Hz) | 1.664 |
| M1 & Track Configuration | Mass (M1) Diameter (Ft) | 5.0 |
| M1 & Track Configuration | Friction Coefficient | 0.15 |
| M1 & Track Configuration | Track Radius (Ft) | 21.25 |
| M1 & Track Configuration | Natural Frequency (Hz) | 1.310 |
| M2 Configuration | Vertical Location from Bottom of Hull (Ft) | −40.0 |
| M2 Configuration | Separation of Halves (Ft) | 0.0 |
| Mooring Configuration | Line Length (ft) | 72.07 |
| Mooring Configuration | Mooring Line Stiffness (N/m) | 6825000 |
| Mooring Configuration | Location of Mooring on Hull | Midships |

The rate of travel, speed, of the mass 26 can be tuned to work the natural frequency of the system by adjusting its Friction Coefficient. The Friction Coefficient equals the amount of energy being taken out of the system.

When the ocean/wave properties have a natural frequency of 1 Hz, the average power generated is 1119.98 kilowatts. However if the ocean/wave properties change such that the natural frequency is 0.8 hertz, the average power generated drops to 658.09 kilowatts. By tuning various elements related to the system 20 as shown in Table 2, the average power generated is raised from the 658.09 kilowatts.

TABLE 2

While the hull 28 geometry has not changed, the tunable mass 134 change in location adjusts the natural frequency of the hull 28.

| Type of property | Property | Value |
|---|---|---|
| Hull Geometry | Length (ft) | 40.0 |
| Hull Geometry | Beam (ft) | 100.0 |
| Hull Geometry | Depth (ft) | 27.52 |
| Hull Geometry | Draft (ft) | 13.76 |
| Hull Geometry | Pitch Natural Frequency (Hz) | 1.571 |
| M1 & Track Configuration | Mass (M1) Diameter (Ft) | 5.0 |
| M1 & Track Configuration | Friction Coefficient | 0.15 |
| M1 (Mass 26) & Track Configuration | Track Radius (Ft) | 15.56 |
| M1 (Mass 26) & Track Configuration | Natural Frequency (Hz) | 1.571 |
| M2 (Tunable Masses 134) Configuration | Vertical Location from Bottom of Hull (Ft) | −40.0 |
| M2 (Tunable Masses 134) Configuration | Separation of Halves (Ft) | 18.0 |

TABLE 2-continued

While the hull 28 geometry has not changed, the tunable mass 134 change in location adjusts the natural frequency of the hull 28.

| Type of property | Property | Value |
|---|---|---|
| Mooring Configuration | Line Length (ft) | 72.07 |
| Mooring Configuration | Mooring Line Stiffness (N/m) | 6825000 |
| Mooring Configuration | Location of Mooring on Hull | Midships |

By tuning both the track and the hull to change their natural frequency from 1.664 hertz to 1.571 hertz, the system 20 is better tuned to the ocean. The system 20 is tuned by the track radius being changed. The track radius is changed by either flexing the track or by moving the two curved portions further apart or closer together; FIG. 12 shows the curved portions separated by a linear portion. In changing the track radius, the natural frequency of the mass and the track changes. In addition, by moving the tunable masses 134 locations, the hull's natural frequency is changed without changing, the size of the hull.

While not changed from the first run to second run shown above, the mooring system 131 can be used to tune the natural frequency of the mass 26/track 24/hull 28 geometry by adjusting the position that the mooring line 132 is attached to the hull 28, by adjusting the length of the mooring line 132, and by adjusting the properties and material from which the mooring line 132 is made. The mooring system 131 creates a reciprocating motion of the hull 28 in relationship to the anchor location, which can be used to tune the natural frequency of the system 20 for the purpose of maximizing energy output of the system 20.

In addition to changing the property of the hull and the track, the rolling properties of the mass can be tuned further by having a locking mechanism related to the movement of the mass 26.

TABLE 3

Locking Parameters

| Property | Value |
|---|---|
| Lock Angle | 5 |
| Lock Force | 5 |
| RV Limit (m/sec) | 0.2 |
| Pitch Rate Limit | 0.5 |

The mass 26 can incorporate a "Brake/Lock" feature that can be used to stop the mass 26 or hold the mass 26 stationary at a fixed position once the mass 26 has stopped.

| Type of property | Property | Value - Run 3 | Value - Run 60 |
|---|---|---|---|
| Hull Geometry | Length (ft) | 40.0 | 40.0 |
| Hull Geometry | Beam (ft) | 100.0 | 100.0 |
| Hull Geometry | Depth (ft) | 27.52 | 27.52 |
| Hull Geometry | Draft (ft) | 13.76 | 13.76 |
| Hull Geometry | Pitch Natural Frequency (Hz) | 1.664 | 1.571 |
| M1 & Track Configuration | Mass (M1) Diameter (Ft) | 5.0 | 5.0 |
| M1 & Track Configuration | Friction Coefficient | 0.05 | 0.15 |
| M1 & Track Configuration | Track Radius (Ft) | 42.5 | 15.56 |
| M1 & Track Configuration | Natural Frequency (Hz) | .897 | 1.571 |
| M2 Configuration | Vertical Location from Bottom of Hull (Ft) | −40.0 | −40.0 |
| M2 Configuration | Separation of Halves (Ft) | 0.0 | 18.0 |
| Mooring Configuration | Line Length (ft) | 72.07 | 72.07 |
| Mooring Configuration | Mooring Line Stiffness | 3140800 | 6825000 |
| Mooring Configuration | Location of Mooring on Hull | Stern | Midships |
| Locking Parameters | Locking Angle | 0 | 14 |
| Locking Parameters | Locking Force | 0 | 5 |
| Locking Parameters | RV Limit | 0 | 0 |
| Locking Parameters | Pitch Rate Limit | 0 | 0 |
| Performance Summary | Avg. Power Generated (KW) | 199.94 | 1302.01 |

Table 4 shows two different runs. The varying of the tunable parameters listed in Table 4 shows that the average power generated can be increased by factors such as 5 for the same wave state.

It is important that the energy developed by the rolling mass 26 be converted to electrical power without mechanical losses, maximizing the energy output of the system. Because the mass 26, the rolling energy generating mass is rolling, there is a rotary motion that should be harnessed to the rotary motion of a generator. In a rotary to rotary system there are minimal energy losses due to gearing. In a rotary to linear system, such as a ball screw where linear motion is being converted to rotary motion (like wind being converted to the rotary motion of a propeller) the energy losses are substantial, 40% to 60% losses.

Figure 13:
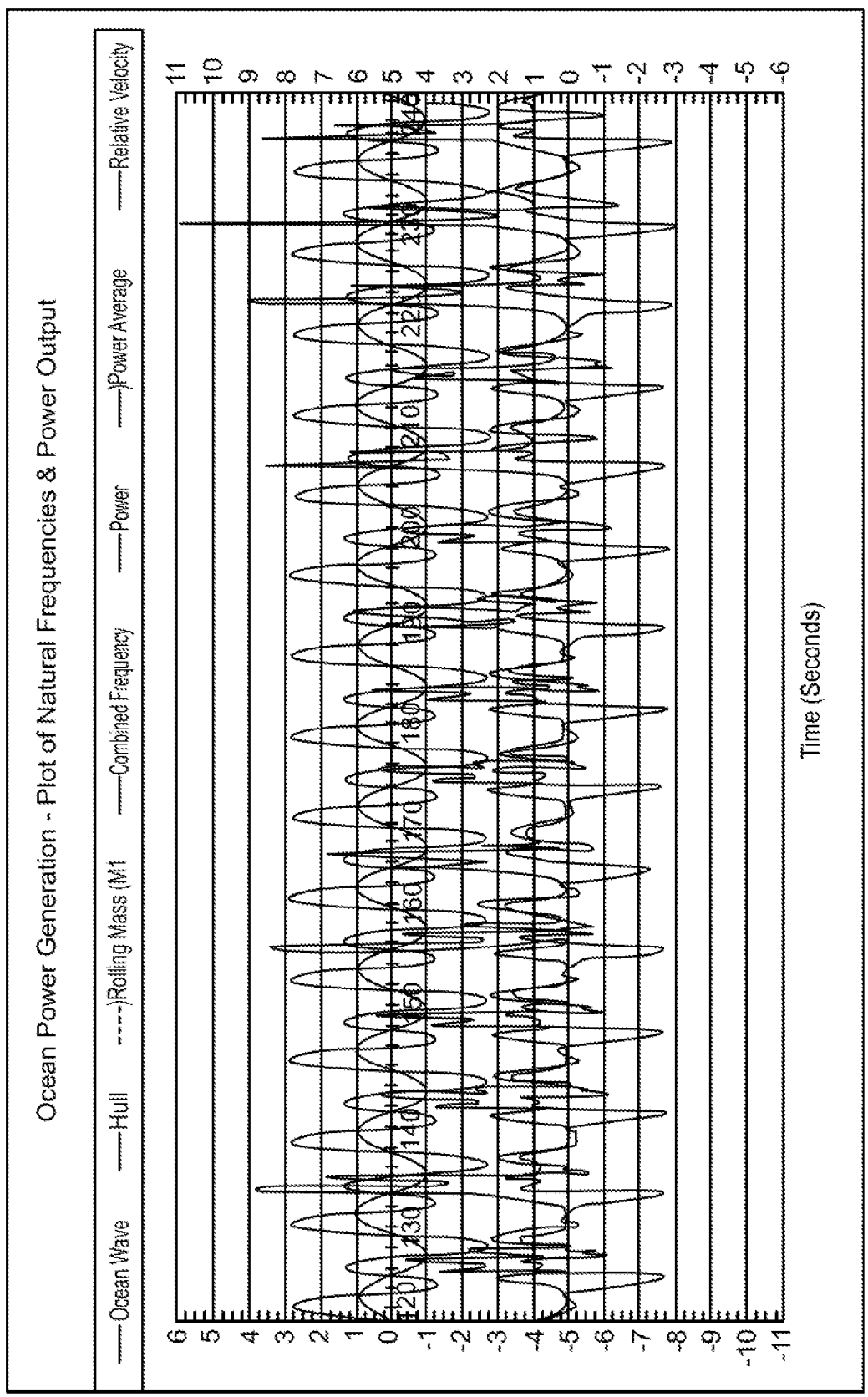
FIG. 13 is a graph of the natural frequencies of various elements of the system and the power output for one experimental run of the system.

Referring to FIG. 13, a graph shows the natural frequency of one run where the rolling mass 26 and the track 24 has a natural frequency of 1.57 hertz. The hull 28 geometry likewise has a natural frequency of 1.57 hertz. As indicated above, the hull 28 frequency is affected by several factors including the mooring system including the mooring line 132 and the position it is secured to the hull 28. In addition the tunable masses' 134 location affects the natural frequency of the hull 128. For an ocean having waves that have a natural frequency of 0.8 hertz, average power generated is: 1,302 KW (1.3 MW). In this run, the mass 26 had the locking mechanism described above actuated.

This mechanism or system 20 has two-degrees of freedom of motion. The hull 28 actuates independently and its pitch motion creates one-degree of freedom of motion, and the mass 26, the rolling energy generating mass, which rolls on the track 24 attached to the hull 28 of the floating platform 22 or 128, actuates independently in the same axis as the pitch of the hull 28 creating a dynamic second degree of freedom of motion. Unlike a traditional one-degree of freedom motor/generator, such as a conventional piston/cylinder in which power is generated and removed from the motor via the piston, in a two-degree of freedom motor/generator power is generated and removed from the motor via the dynamic second degree of freedom element, the rolling mass, M1 (Power=M1 divided by 550 ft/pounds per second).

The shape of the ocean wave, the wave's period and height, are what actuate the dynamic, two-degree of freedom, Mechanism/System. The Natural Frequency of the wave is tuned by the forces of nature. The ocean depth affects the shape of the wave, how steep it is. As waves approach the shore, they become steeper, which changes the natural frequency of the wave. A high frequency, short-wave-length wave has appreciable power even though its amplitude or wave height is relatively small. The rate of energy is proportional to the wave's speed. The natural frequency of the mass 26/track 24/hull 28 including the mooring system 132 of the system 20 can be tuned to work with the natural frequency of the wave in deep or shallow water.

While other ratios may work, it has been found that matching the mass 26/track 24 and the hull frequency 28 to each other and having those frequencies be in the range of approximately 1.6 to 2 greater than the natural frequency of the ocean results in maximum power generated.

Figure 14:
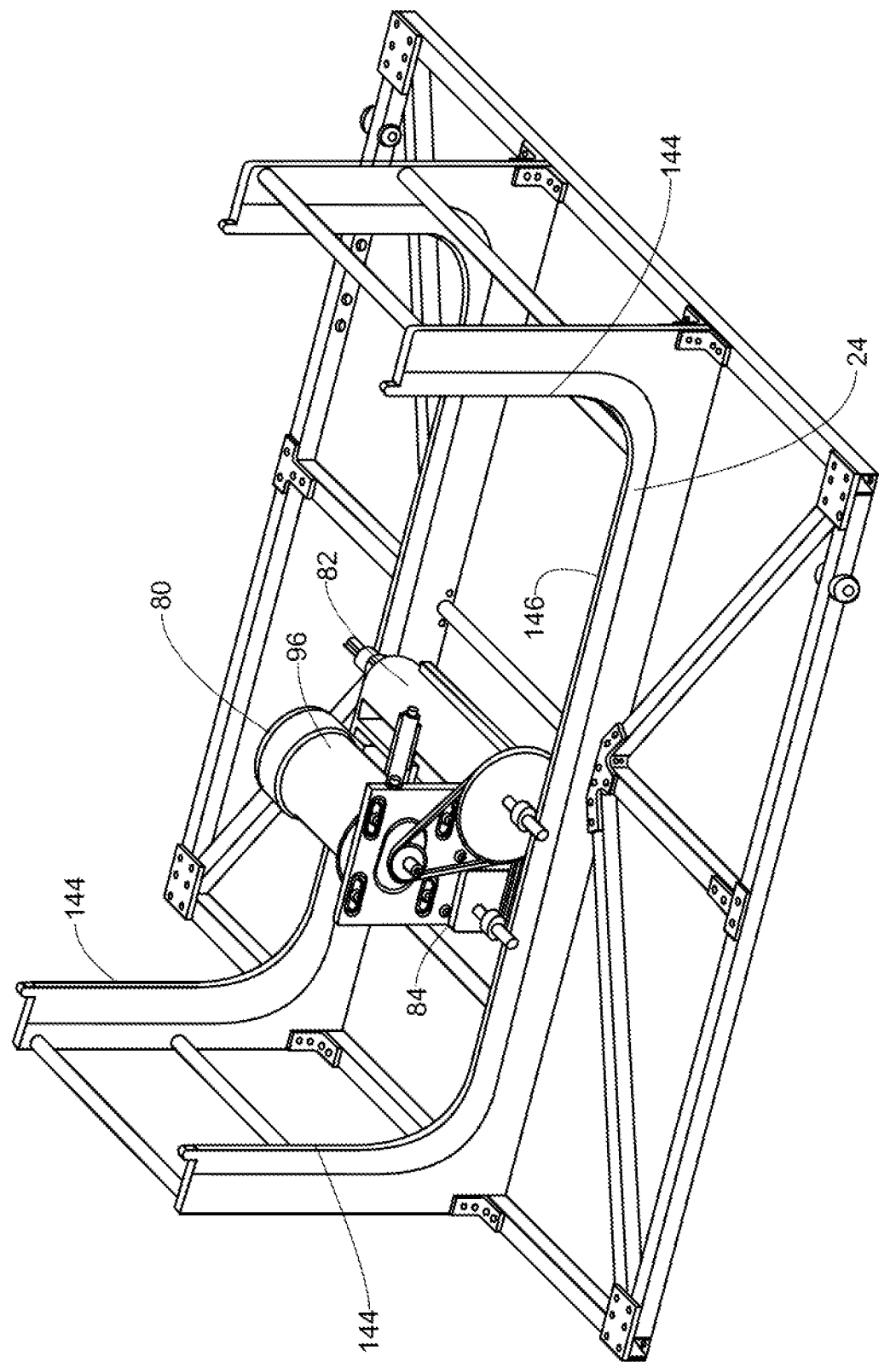
FIG. 14 is an isometric view of the track with the unit having, the rolling masses.

Referring to FIG. 14, a perspective view of the unit 80 with the mass 26 in the form of the mass 80 and the mass 82 is shown on the track 24. The track 24 has as pair of curved portions 144 and interposed linear portion 146. The unit 80 has the electrical generator 96.

It has been recognized that the hull 28, such as shown in FIG. 12, should be lightweight, and the mass 26 (M1) the rolling mass, should be heavy. The mass 26 is the mass that creates high power density energy. The hull 28 is basically a support platform for the mass 26/track 24 and a mechanism to create displacement, buoyancy force. The tunable mass 134 (M2), the "preload" weight, creates stability for the hull 28 by pulling the draft of the hull 28 down into the water, creating displacement, which produces as buoyancy force.

While various parameters have been tuned in the runs described, it is recognized that other items listed in the tables can be tuned. In addition, the mass or weight of the tunable masses 134, the hull 28 and the mass 26 could be varied. The varying of each could vary by switching out components or by adding or removing ballast. The geometry of the hull 28 could also be varied. The length of the hull influences the moment of the inertia. As further indicated below, the mooring arrangement can be tuned. The diameter and the length of the mass 6 also could be varied to tune the system 20.

It is recognized that additional parameters can be tuned. For example, the mooring line 132 while moved from the trailing edge 36 in FIG. 10 to the midships in FIG. 12, the length or material of the mooring line 132 did not change in the first two runs described. The length or material of the mooring line 132 could influence the natural frequency of the floating platform 22 or 128 of the system 20. The anchor or where the mooring line is connected relative to the waterline also could be used in tuning the system 20. The mooring system creates a reciprocating motion of the hull in relation to the fixed anchor location. As the fulcrum of the wave passes beneath the hull, the radius of the mooring line moves in an arc, creating a reciprocating motion. This is a tunable parameter. In addition, the track 24 could be further tailored to adjust the rate of roll.

It is further recognized that a flywheel can be used to capture and store energy from the rolling mass 26 and to drive a generating system. Because the rolling mass 26 changes direction of rotation on each side of the wave, a simple cam stem can be used to keep the flywheel and/or generator always rotating in the same direction. Basically, a cam would flip when the rolling mass 26 reverses direction at the end of each stroke on the track 24, causing the flywheel or generator to continue to rotate in the same direction even though the rolling mass 24 is changing direction.

The above embodiment of the system 20 shows the mass sliding or rolling relative to the hull. It is recognized that the mass can be movably mounted to the hull in alternative ways.

Furthermore as evident from above, the hull 28 and the tuning mass 134 as seen in FIGS. 10-12 are a mass. In addition, the hull 28 and the tuning mass 134 move relative to the floor or ground plane of the ocean on which the mooring anchor 130 is located. In referring to the system 20, the hull 28 and the tuning mass 134 and other components can be referred to as a first movable mass 164. The mass 26 can be referred as a second movable mass 152.

Figure 15:
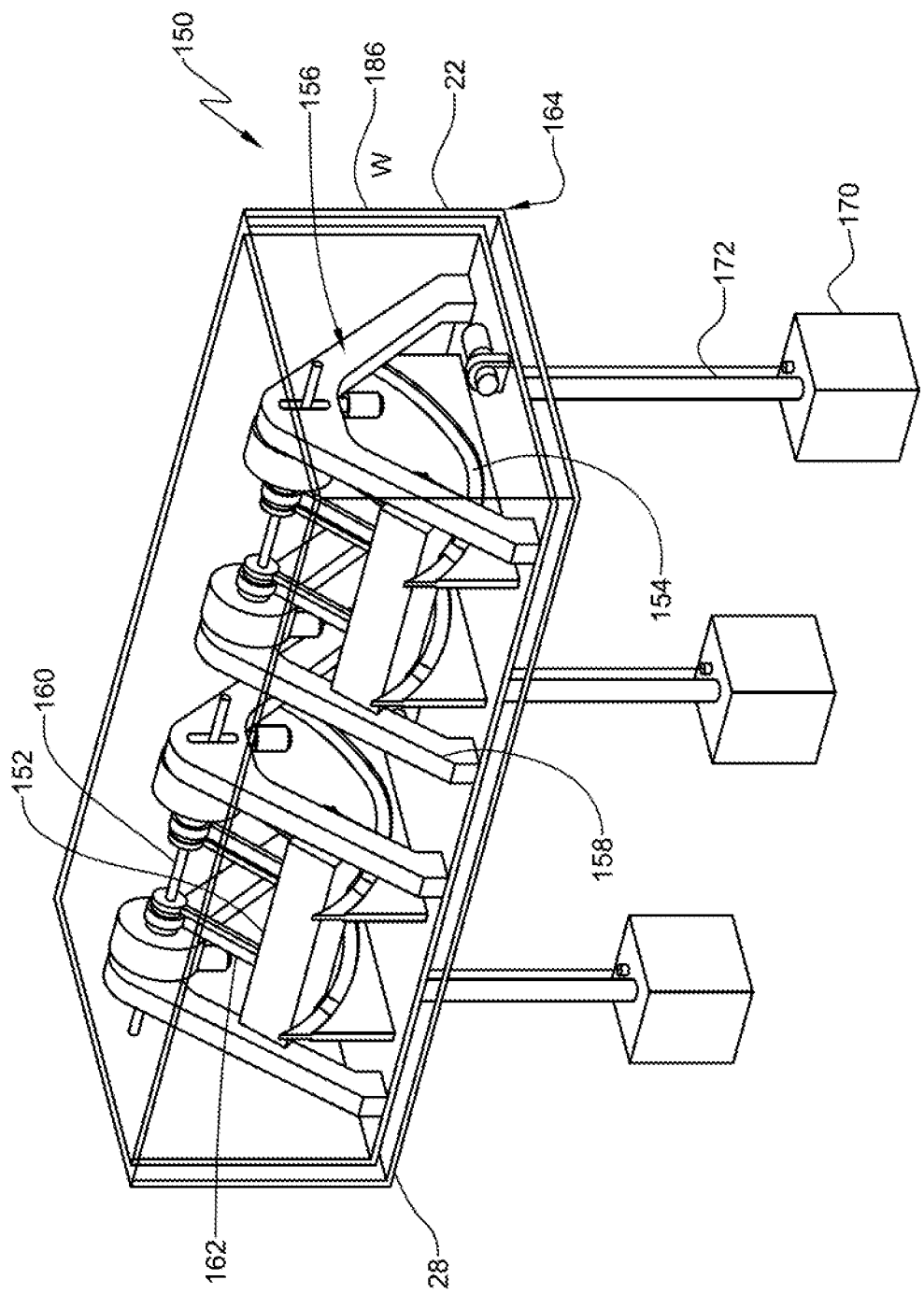
FIG. 15 is a perspective view of an alternative floating platform.

Referring to FIG. 15, a perspective view of a system 150 having a floating platform 22 is shown. The floating platform 22 has as hull 28 that is sized to contain two sets of swinging masses 152. The swinging masses 152, while guided by a track 154, are pivotably carried by a pendulum 156. The pendulum 156 has a truss 158 that carries a pivot rod 160. The swinging masses 150 are slidably carried on a pendulum rod or a pair of pendulum rod(s) 162 that oscillate as the pivot rod 160 rotates relate to the truss 158.

Still referring to FIG. 15, the system 150 has a plurality of counterbalance weights or masses 170 located below the hull 28, which are similar to the tuning masses 134 in FIGS. 10-12. The counterbalance masses 170 are positioned below the hull 28. Each counterbalance mass 170 is carried on a counterbalance weight rod 172. The hull 28, the truss 158, the counterbalance masses 170, and other components are all part of the first movable mass 164.

Referring to FIG. 16, a front sectional view of the floating platform 22 of the system 150 is shown. Each of the swinging masses 152, the second movable masses 152, can be moved up or down on the pendulum rod(s) 162 by way of an adjustment mechanism 166. In the embodiment shown, the adjustment mechanism is an electric motor 168, as best seen in FIG. 17, that drives a chain fall or cable 174. The pendulum rod 162 extends from the pivot rod 160 to the track 158 regardless of the position of the swinging or second movable mass 152

Still referring to FIG. 16, the counterbalance mass 170 likewise can be adjusted upward or downward on the counterbalance weight rod 172 by way of an adjustment mechanism 178. In the embodiment shown, the adjustment mechanism 178 is an electric motor 180 that drives a cable 182 connected to the counterbalance mass 170 as best seen FIG. 17. The adjustment of the counterbalance mass 170 as part of the first movable mass 164 and the adjustment of the swinging or second movable mass 152 allows the system 150 to be tuned to generate the maximum movement of the second movable mass 152 relative to the first movable mass 164.

The system 150 generates energy by extracting energy created by the relative motion between the components, therefore it is desirable to have the second movable mass 152 moving in the same direction as the first movable mass 164. While the masses are moving in the same direction there is still relative motion as is shown in FIGS. 19-19D.

Referring to FIG. 17, a side sectional view of the floating platform 22 of the system 150 is shown. The swinging movable masses 152 are shown within their tracks 154. The second movable mass 152 can be adjusted upward or downward using the adjustment mechanism 166 including the electric motor 168 and the chain fall or cable 174. The truss 158 of the pendulum 156 carries the pivot rod 160.

In contrast to the previous embodiments, it is contemplated that the entire system 150 will be lower in the water. The nominal water line 186 is shown. While the previous embodiments show the track 24 upon which the mass 26 generally is above the water line, it is recognized that dependent on the exact configuration including the amount of reserve buoyancy, the hull 28 of the floating platform 22 can be adjusted in the water as part of tuning of the system 20 or 150. In addition, FIGS. 15-17 show that the hull 26 is a double hull. Water can be pumped in and out of portions of the double hull to tune the system.

Figure 18A:
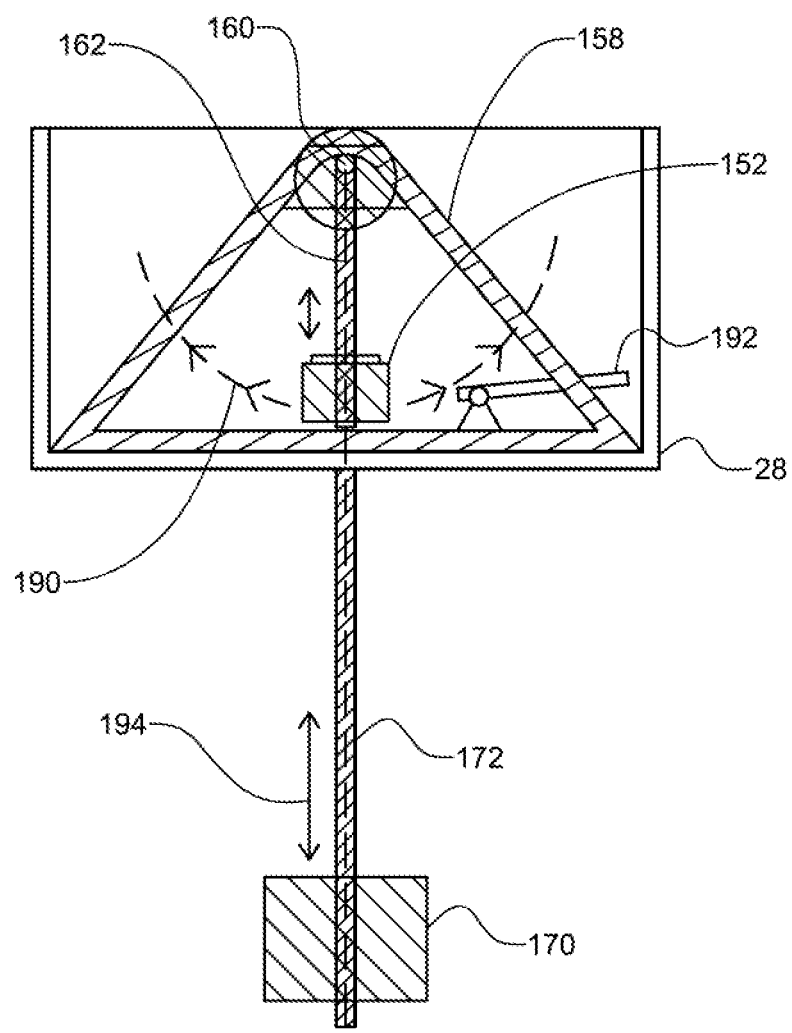
FIGS. 18A and 18B are schematic side and front views, respectively, of the floating platform showing tuning of the masses.

Referring to FIG. 18A, a schematic side view of the embodiment shown in FIGS. 15-17 is shown. The arrows 190 show the motion of the masses, the second movable mass 152, relative to the hull 28, which is part of the first movable mass 164. In addition, the hull 28 is pivoted by the wave action. It is this pivoting that causes the second mass 152 to move relative to the hull 28 and the counterbalance masses 170, which are both part of the first movable mass 164. The adjustment of the positions of the masses tunes the system.

The system 150 shows a braking mechanism 192 to adjust the movement of the swinging masses 152. The movement of the swinging masses 152 is further described below with respect to FIGS. 19A-19C.

Figure 18B:
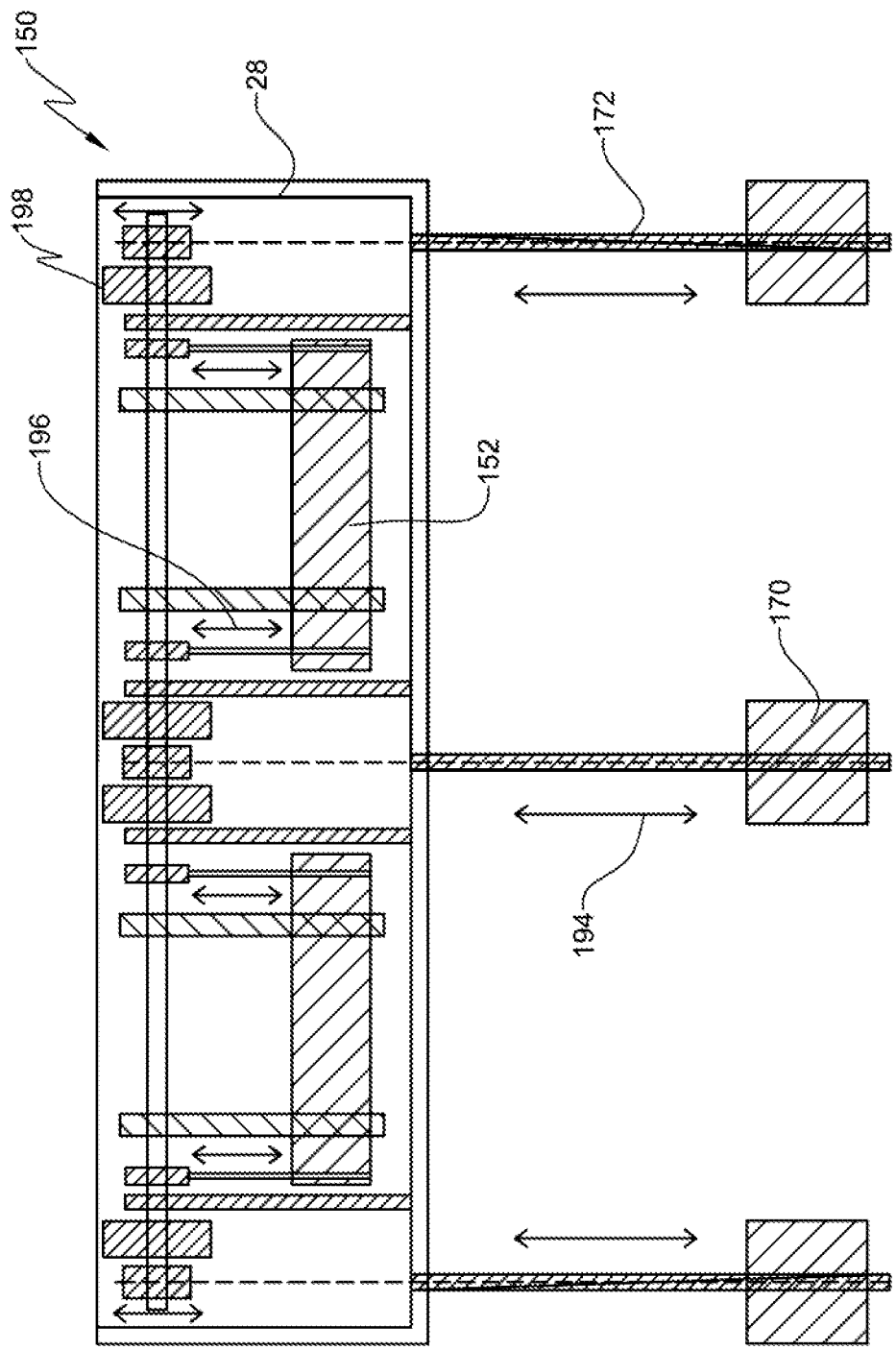

Both FIGS. 18A and 8B show an arrow 194 which represents the movement of the counterbalance mass 170 by the adjustment mechanism 178. Still referring to FIG. 18B, which is a front view of the system 150, shows in addition to an arrow 194, an arrow 196 which represents the movement of the second movable mass 152. In addition, the system 150 has a series of flywheels 198 that extract the rotational energy from the movement of the second movable mass (the swinging mass) 152 relative to the first movable mass 164.

Figure 19A:
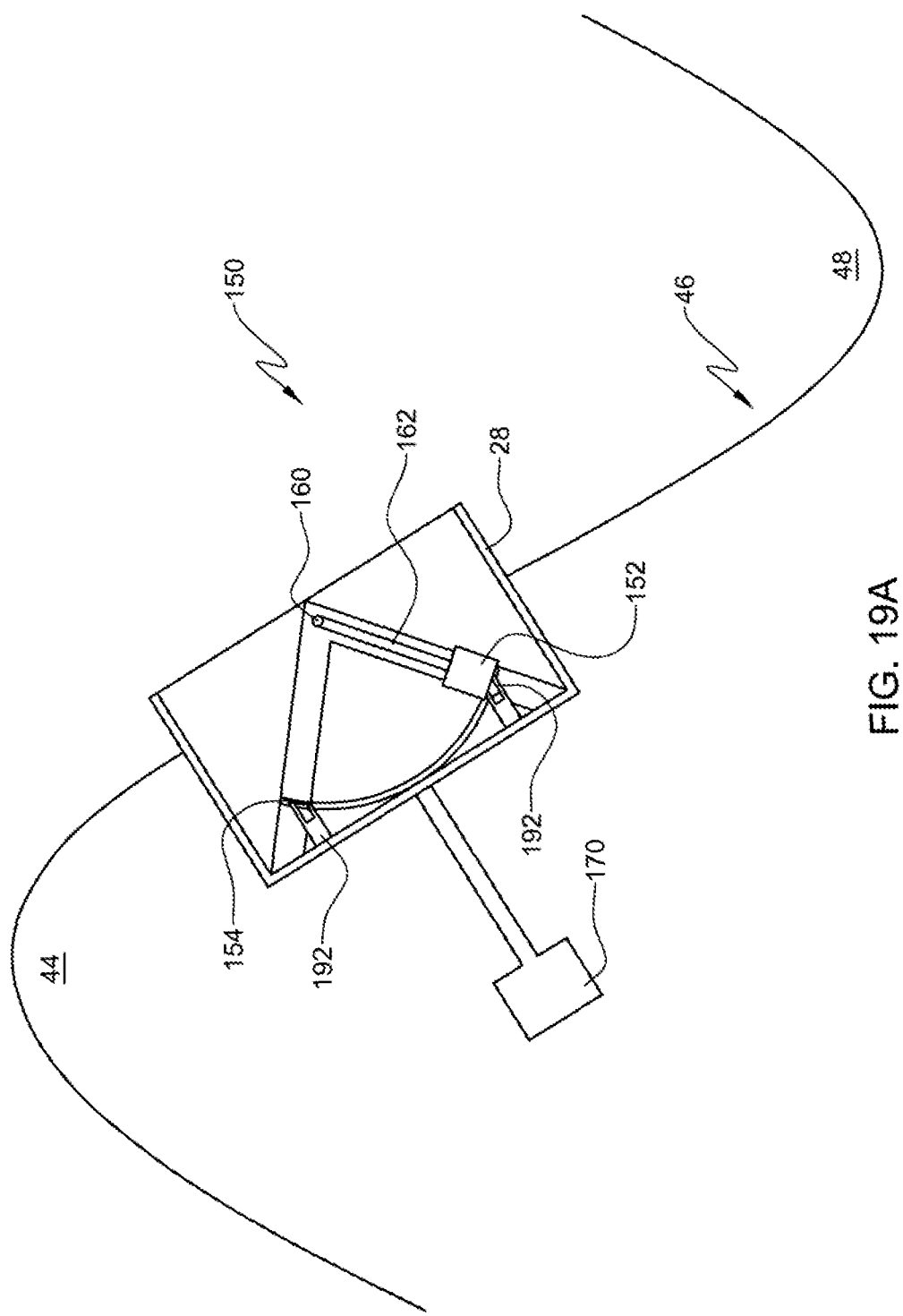
FIG. 19A is a schematic side view of the floating platform showing braking for tuning of the masses.

Referring to FIGS. 19A-19D, schematic views of the system 150 are shown showing the adjusting the position the second movable mass 152 relative to the hull 28 and rest of the first movable mass. FIG. 19A shows the hull 28 on the wave 46 with the swinging mass, the second movable mass, 152 located near the trough 48. The brake mechanism 192 retains the swinging mass 152.

Figure 19B:
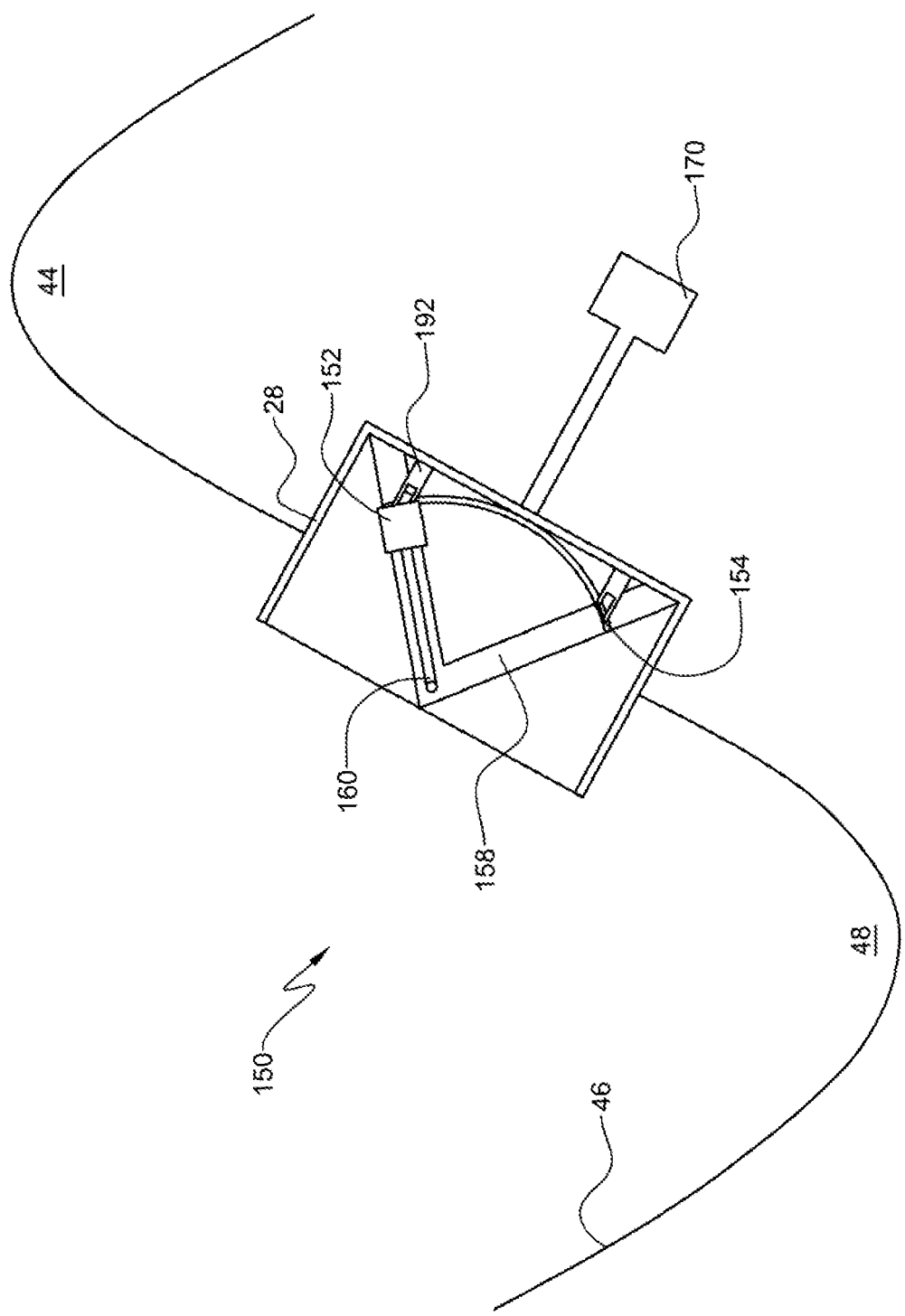

As the hull 28 is shifted in the other direction by the wave 46, the swinging mass 152, which is held in place by the braking mechanism 192, is now on the same side as the counterbalance mass 170 as shown in FIG. 19B. In addition to the braking mechanism 192, the system 150 is capable of being tuned in other ways including by adjusting the second movable mass (the swinging mass) 152 relative to the height on the pendulum rod 162 using the adjustment mechanism 166 and adjusting the counterbalance masses 170 by the adjustment mechanism 178. The retention of the swinging masses 152 by braking allows the swinging mass 152 to be on the same side as the counterbalance mass 170, just one form of tuning.

Figure 19C:
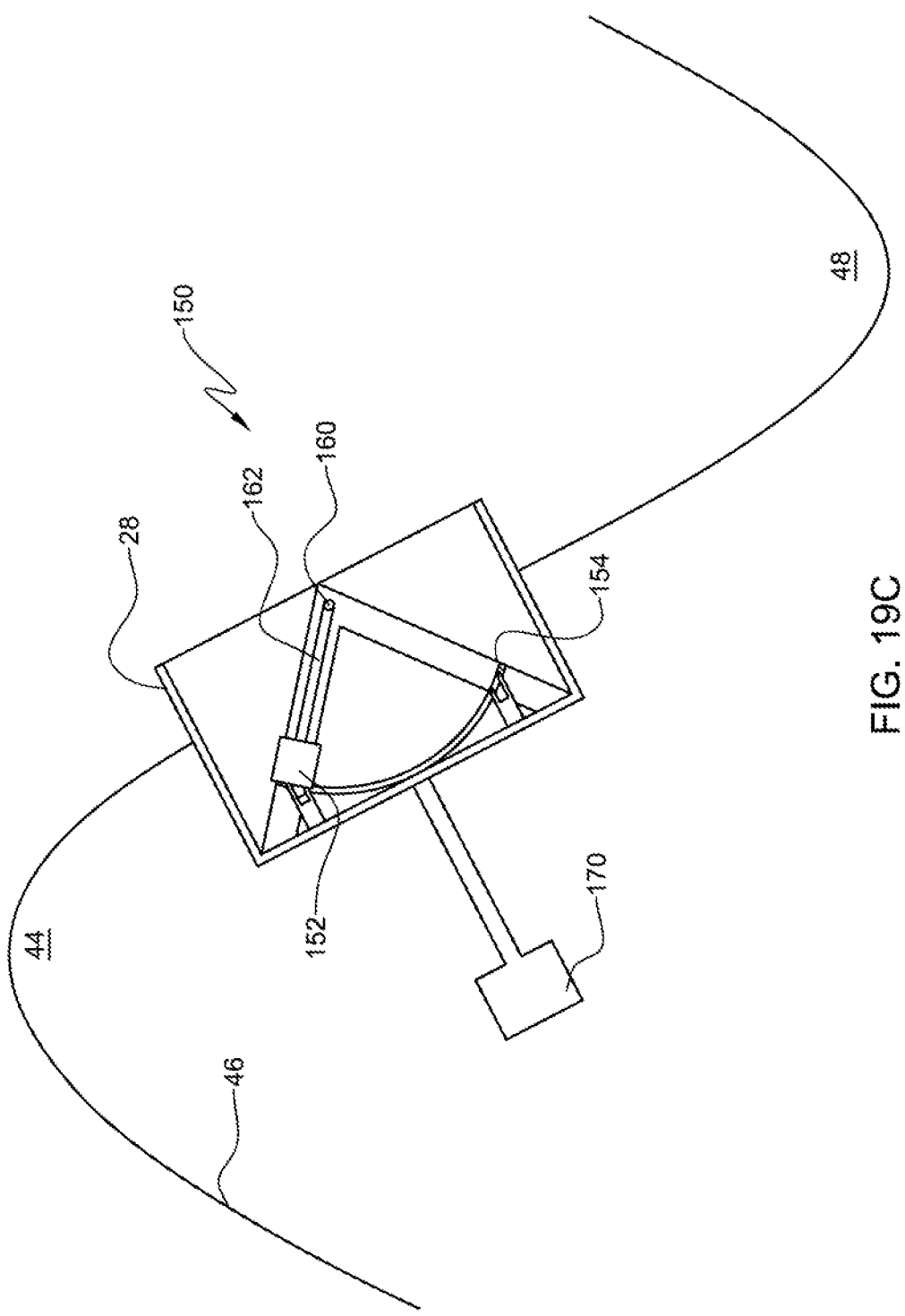

The brake mechanism 192 is released to allow the swinging mass 152 to pivot on the pendulum rod 162 relative to the pivot rod 160 such that as the wave passes relative to the hull 28 of the system 150, and the hull 28 orientation reverses, the swinging mass 152 moves to the crest 44 side of the hull 28 as seen in FIG. 19C. FIG. 19D is similar to FIG. 19B however, the brake mechanism 192 is shown released in FIG. 19D. It is recognized that the brake mechanism 192 is released slightly after the time that FIG. 19B shows in order to get to the position shown in FIG. 19C.

By placing the swinging mass 152 on the same side as the counterbalance mass 170, a larger displacement can occur of the swinging mass 152 relative to the track 154 and the hull 28. By having this larger displacement, greater energy can be extracted from the system.

In one embodiment, the hull 28 has a length of forty feet. The width, the portion that is generally parallel the crest of the wave, is one hundred feet.

Referring to FIG. 20, an alternative embodiment of the system 200 is shown. The system 200 has a hull 202 which is pivotally mounted to a pair of pillars 204 embedded into the ocean floor 206 and a base 208. The hull 202 oscillates, similar to that in the previous embodiment, as the waves 46 passes by. The hull 202 pivots relative to a pair of pivot points 210 on the pillars 204. The pivot points 210 are capable of moving up and down the pillars 204 in an embodiment to allow for compensation in variations in the average height of the water.

The hull 202 is sized to contain a set of swinging masses 214. The swinging mass 214 is pivotably carried by a pendulum 216. The pendulum 216 has a suspension rod 218 that carries a pivot rod 220. Similar to the previous embodiment, the swinging mass 214 is capable of moving up and down on the suspension rod 218 of the pendulum 216 for tuning.

The suspension rod 218 is carried by a swing mass brace 224. The brace 224 is carried by an adjustable base 226 which is adjustable relative to the hull 202 of the system 20. The adjustable base 226 is carried by a base suspension rod 228 that extends to the pivot point 210. The base 226 can be moved vertically relative to the keel of the hull 202.

Figure 21:
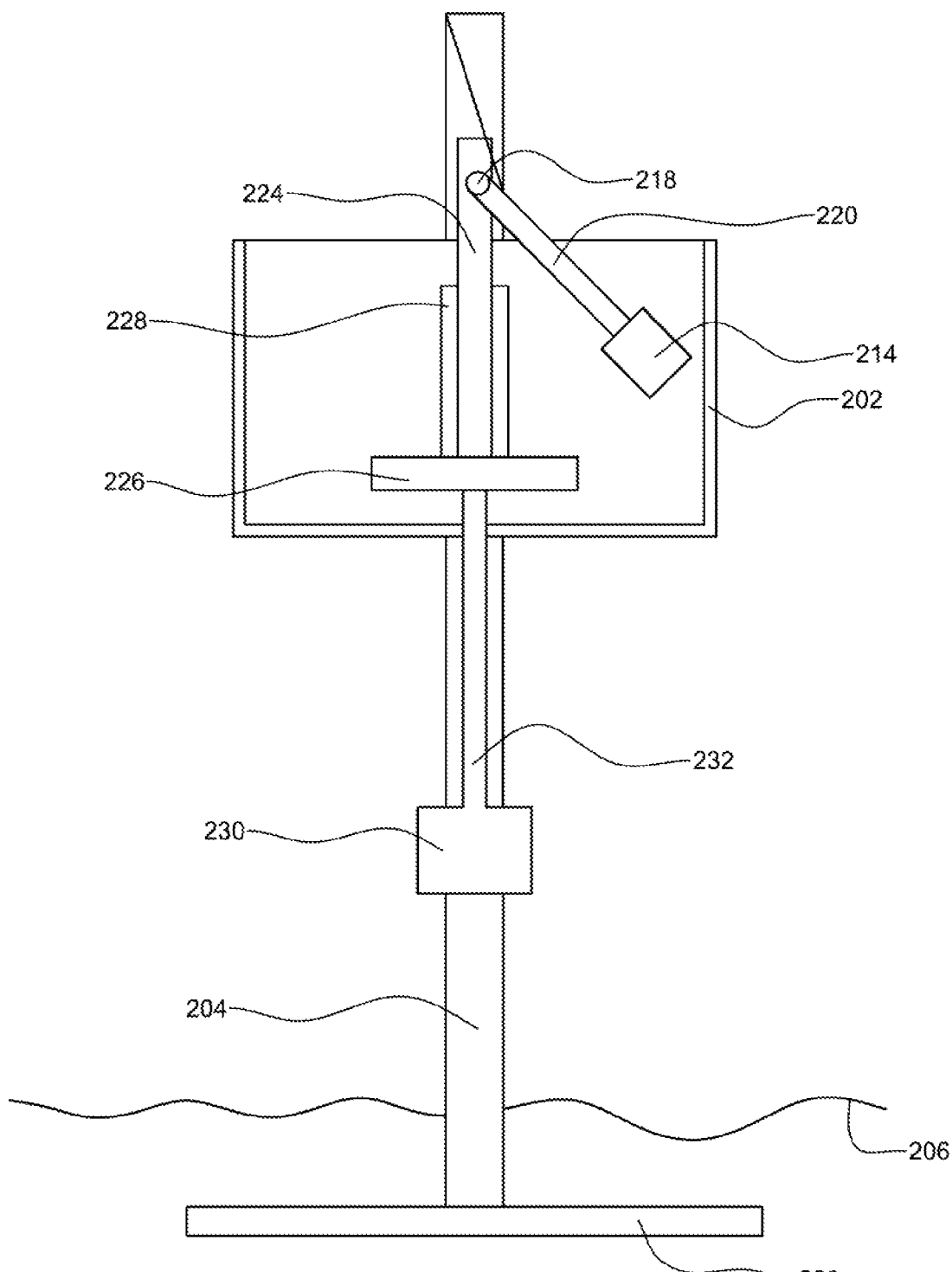
FIG. 21 is a side sectional view of the floating platform of FIG. 20.

Still referring to FIG. 20, the system 200 has a plurality of counterbalance weights or masses 230 located below the hull 202, which is similar to the previous embodiment. Each counterbalance mass 230 is carried on a counterbalance weight rod 232. The counterbalance weight rods 232 extend to the adjustable base 226. The hull 202 the adjustable base 226, the counterbalance masses 230, and other components are all part of the first movable mass. FIG. 21 is a side view of a similar embodiment.

As indicated by the arrows, components can be adjusted relative to each other to tune the system. For example, the base 226 can be adjusted relative to the pivot point 210.

Figure 22:
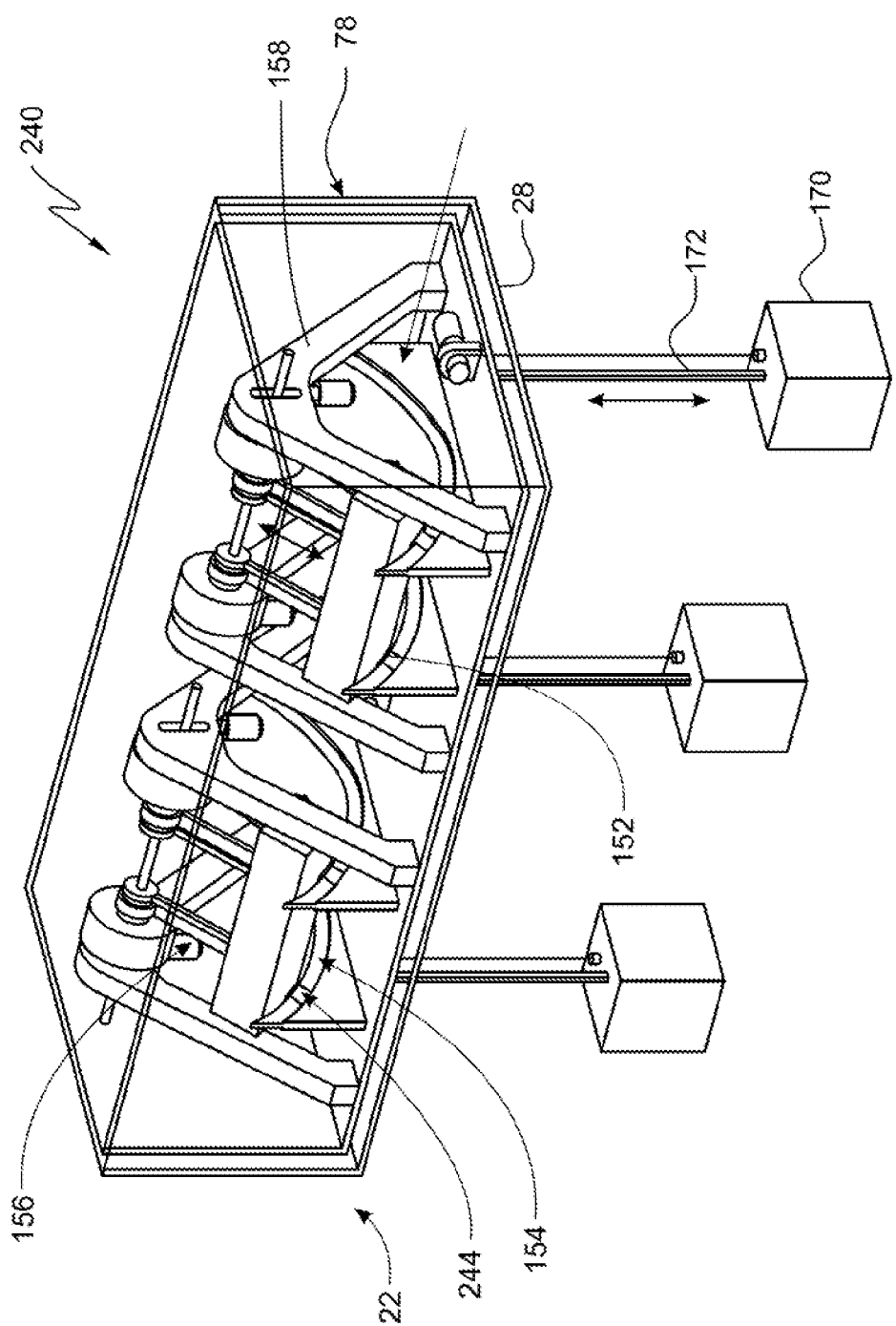
FIG. 22 is a perspective view of an alternative floating platform.

Referring to FIG. 22, a perspective view of an alternative system 240 with a floating platform 22 is shown. Similar to FIG. 15, the floating platform 22 has a hull 28 that is sized to contain two sets of swinging masses 152. The swinging masses 152, while guided by a track or rail 154, are pivotally carried by a pendulum 156. The pendulum 156 has a truss 158 that carries the pivot rod 160. The swinging masses 152 are slidably carried on a pendulum rod or a pair of pendulum rods 162 that oscillates as the pivot rod 160 rotates relative to the truss 158. The position of the swinging mass 152 on the pendulum rods) 162 is adjusted or moved to tune the natural frequency of the second movable mass (swinging mass) 152.

Figure 27:
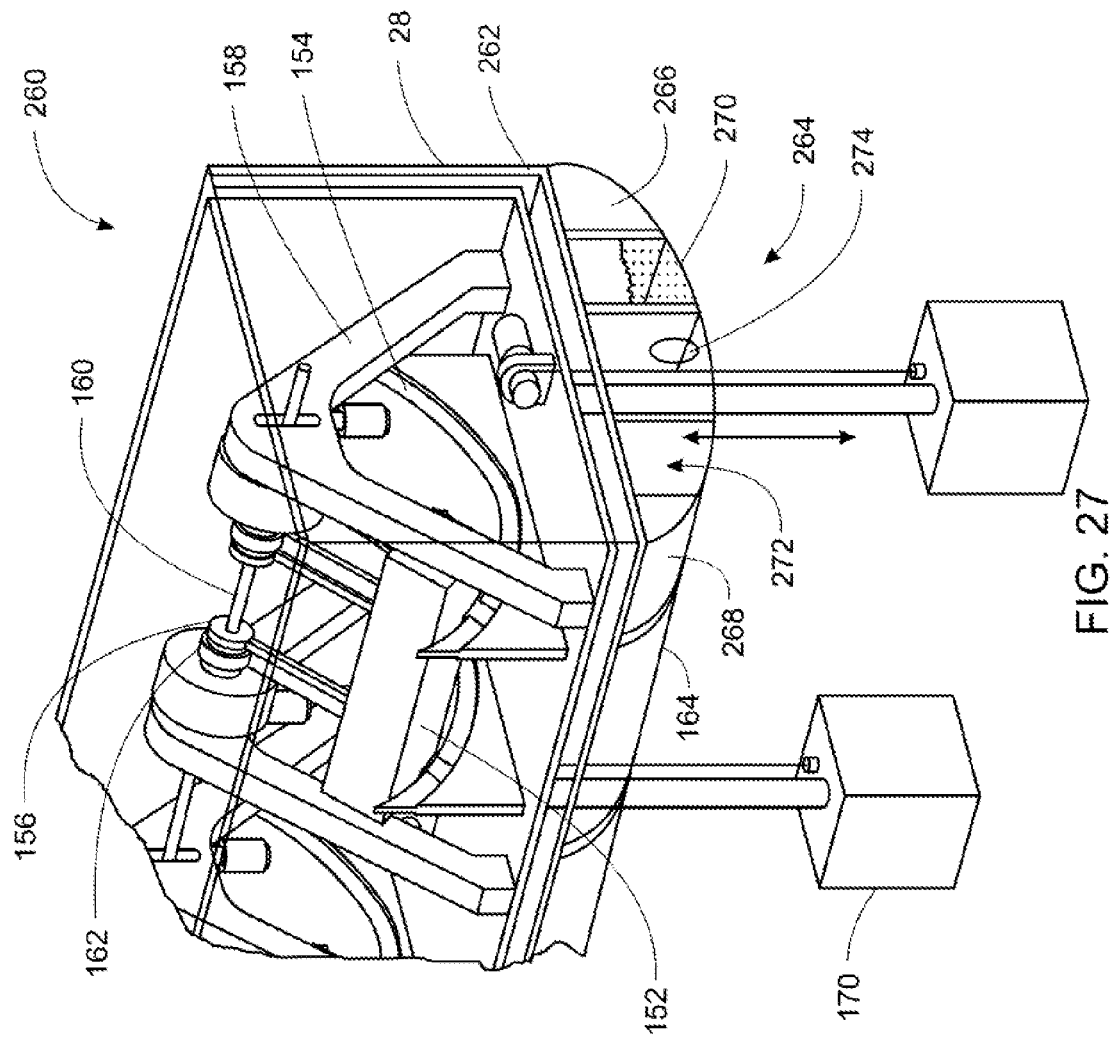
FIG. 27 is a perspective view of a broken out section of the alternative floating platform with an active ballast system.

Still referring to FIG. 22, the system 240 has a plurality of counterbalance weights or masses 170 located below the hull 28, which are similar to the tuning masses 134 in FIGS. 10-12. The counterbalance masses 170 are positioned below the hull 28. Each counterbalance mass 170 is carried on a counterbalance weight rod 172. The hull 28, the truss 158, the counterbalance masses 170, and other components are all part of the first movable mass 164. The position of the counterbalance mass 170 on the counterbalance weight rod 172 is moved to tune the natural frequency of the first movable mass 164. While the counterbalance masses 170 are shown movable only vertically in this embodiment, it is recognized that the tuning can take different forms such as shown in FIG. 10 or supplemented with active tuning such as shown in FIG. 27. The movement of the counterbalance masses 170 is just one method of tuning of the natural frequency of the first movable mass 164.

Figure 23A:
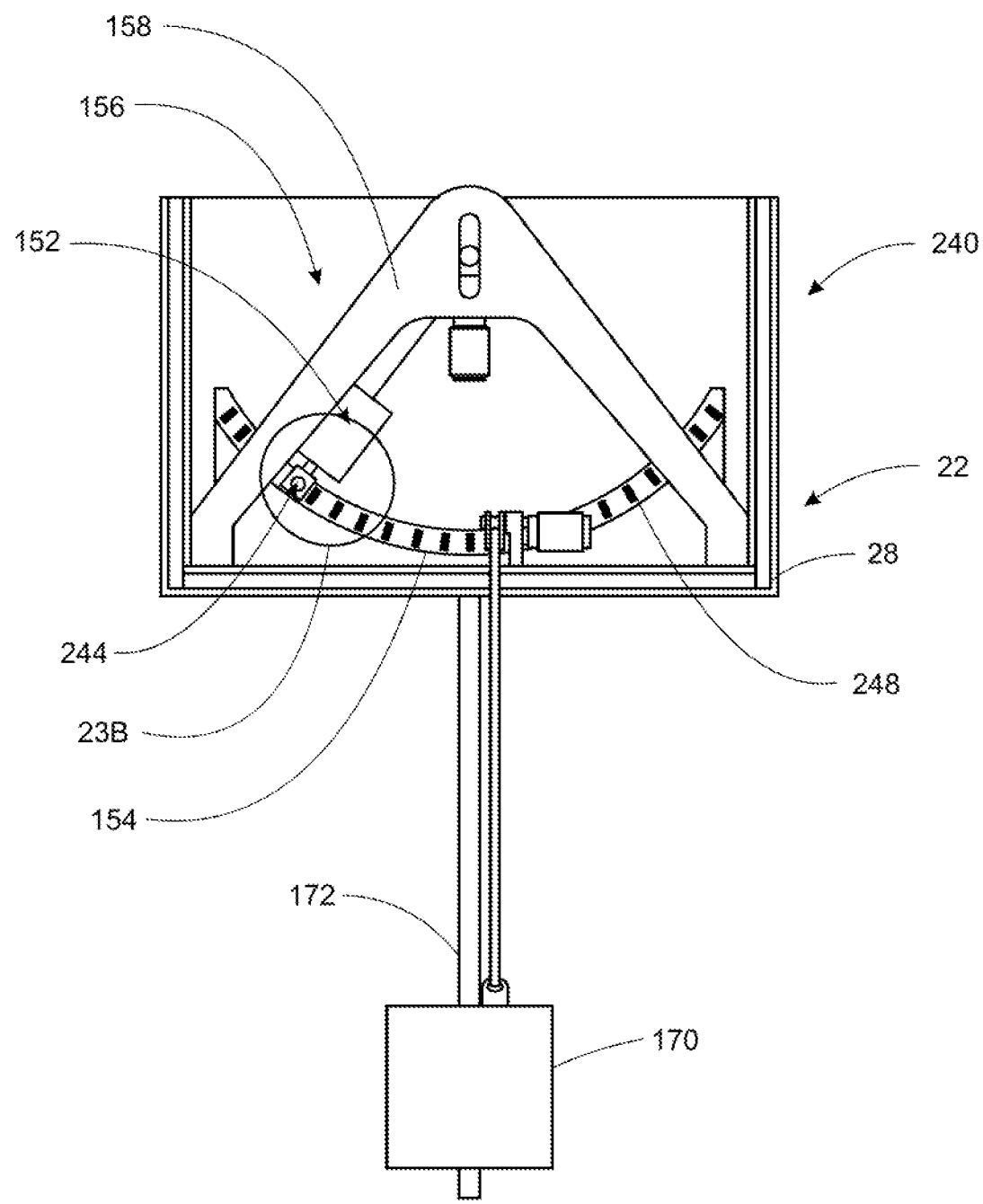
FIG. 23A is a side sectional view of the floating platform of FIG. 22.
Figure 23B:
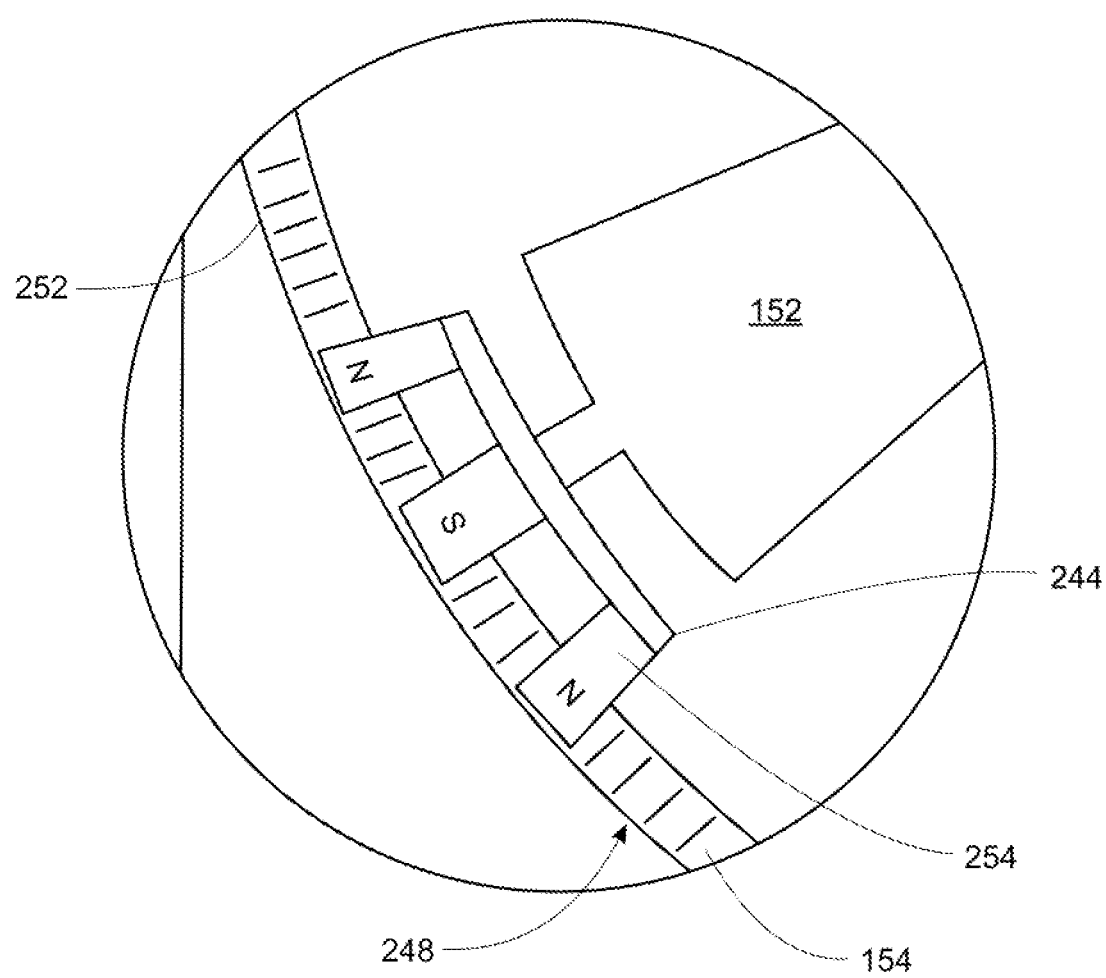
FIG. 23B is an enlarged view of taken along the area 23B in FIG. 23A

In contrast to the embodiment shown in FIG. 15, the system 240 in FIG. 22 does not use a flywheel to gather the energy. In contrast, as seen in FIG. 23A, the end of the pendulum rod 162 is a guide 244 which moves along the track or rail 154. The guide 244 has a magnet 246 or series of coils to create a magnetic field or electromagnetic field, as best seen in FIG. 23B. The track or rail 154 has individual stator segments 248.

The magnetic field, generated by the guide 244, cuts through the stator segments 248, which results in each stator segment 248 generating a current.

Referring to FIG. 23B, an enlarged view of the guide 244 and the track 154 is shown. The track or rail 154 has a plurality of wires 252 that define the stator 248. The guide 244 has a series of poles 254, including both North and South Poles, which create a magnetic field. As the guide 244 moves, the magnetic field, moves relative to the wires 232. In contrast to typical generators where the wire 252 moves relative to the magnetic field, the magnet moves relative to the wires. The current that flows through the wires 252 of the stators 248 is discussed in further detail with respect to FIGS. 28 and 29.

Figure 24:
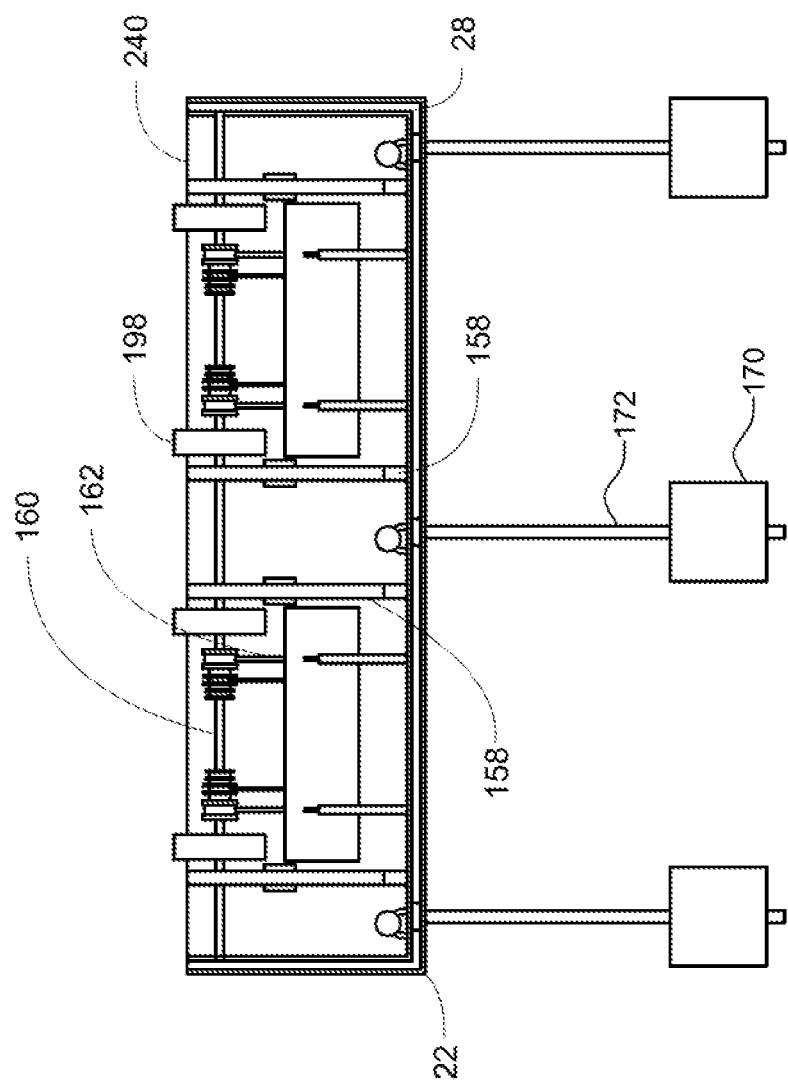
FIG. 24 is a front sectional view of the floating platform of FIG. 22.
Figure 25:
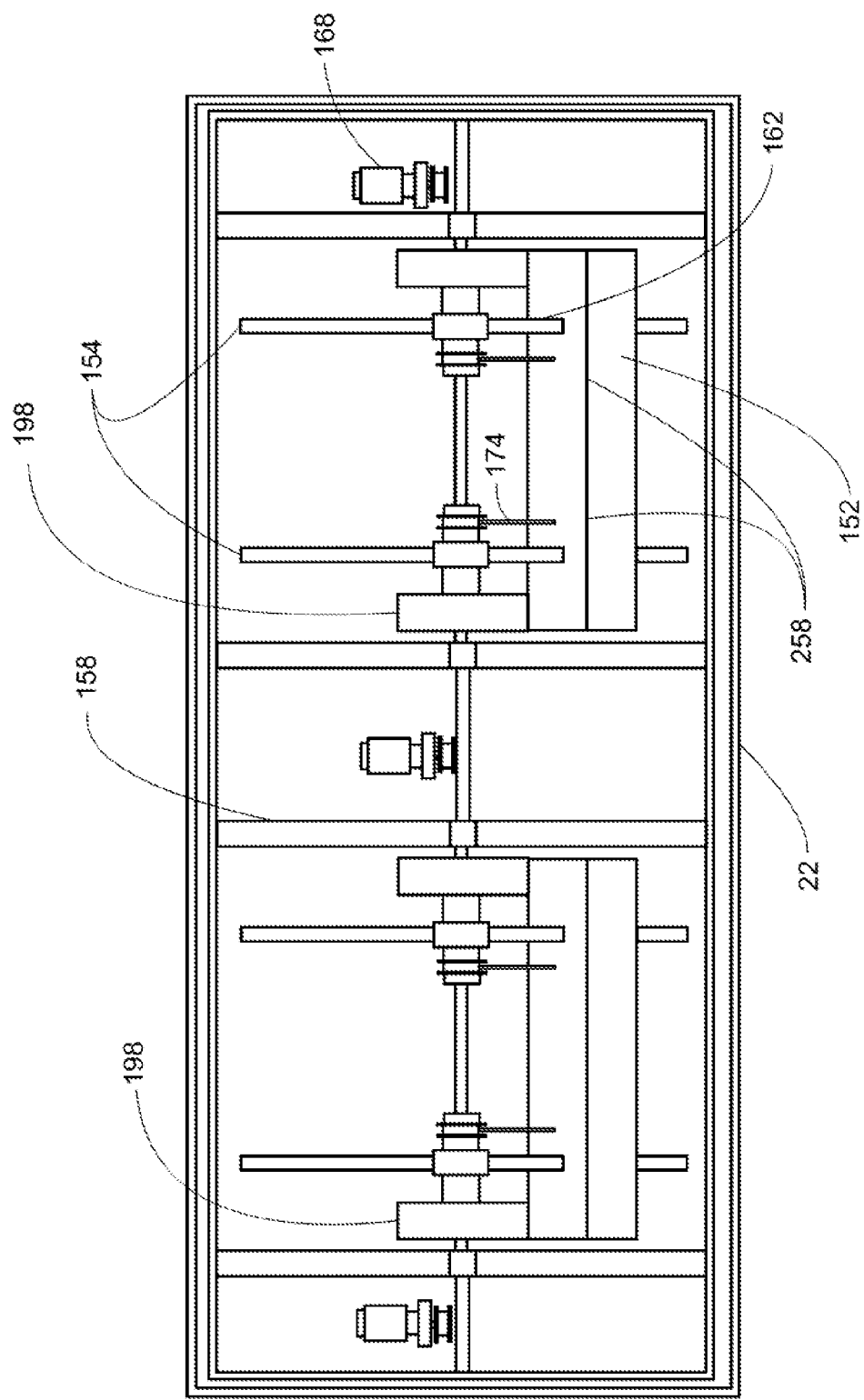
FIG. 25 is a top view of the floating platform of FIG. 22.

Referring to FIG. 24, a front sectional view of the floating platform 22 of the system 240 of FIG. 22 is shown. FIG. 25 shows a top view of the floating platform 22. In that the position of the mass, the swinging mass 152, is adjusted to tune the system 240, in one embodiment, the pole pieces are located in the guide 244 below the swinging mass 152, as seen in FIGS. 23A & 23B.

In addition to gathering energy from the current that flows through the wires 252 of the stator 248, as seen in FIG. 23B, the system 240 can use other devices to convert the kinetic energy of the pendulum 160 and the swinging mass 152. In FIGS. 24 and 25, the system 240 has a series of flywheels 198 that extract the rotational energy from the movement of the second movable mass (the swinging mass) 152 relative to the first movable mass 164.

As indicated above, there is a relationship between the potential energy or power that can be pulled from the system and mass of the moving object. As indicated above as an example, 100,000 ft. lb. of force per second created by a mass moving down an incline plane equals 135,600 watts of electricity. In addition, as energy is pulled from the system, the system will slow the movement of the movable mass relative to the rest of the system. Therefore even in the system 240 where the energy is extracted by the stators, it is desirable to have the swinging masses 152 have a sufficient weight since mass is a major component in determining force.

In that the system has two degrees of freedom, that of the movement of the floating platform, the movable mass 164, including all the associated components relative to the waves and the second degree of freedom related to the movement of the second movable mass (the swinging mass) 152 relative to the first movable mass 164, it is desirable to tune the various elements. It is desirous to have sufficient weight or mass in both the second movable mass 152 and the first movable mass 164. Because of Archimedes's Principle, the floating platform 22, which is floating in the water, is buoyed up by a force equal to the weight of the water, sea water, displaced by the floating platform. Therefore for example in Table 3, the hull geometry described would have a displacement of over 3.5 million pounds which can be allocated between the swinging mass 152 and the component of the first movable mass 164 to improve tuning.

Figure 26:
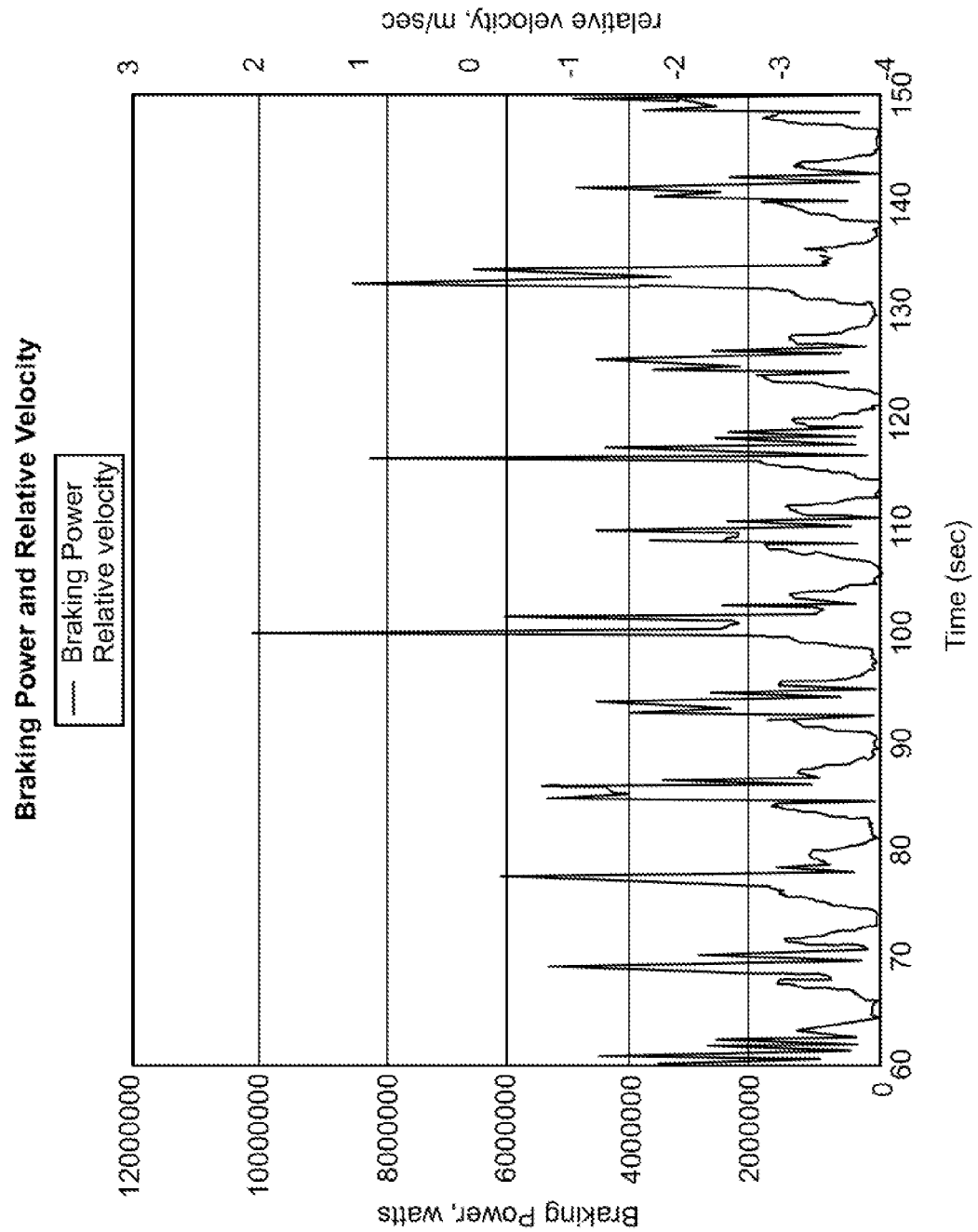
FIG. 26 is a graphical representation of an energy profile.

Referring to FIG. 26, a graphical representation of an energy profile is shown. The relative velocity of the swinging mass 152 relative to the first movable mass 164 (i.e, the hull 28 and other items) is shown. There are several factors that influence the shape of the graph including the frequency of the wave, the natural frequency of the first movable mass 164, and the natural frequency of the swinging mass 152. In addition, the system uses electric braking or regenerative braking to assist in tuning the movement of the swinging mass 152 relative to the first movable mass 164 and also for extracting energy from the system.

In theory, the line represents the available braking power or energy from the kinetic energy of the swinging mass 152. The braking power is the amount of energy that can be pulled from the system either through the flywheels 198 or the stators 248. While the graph in FIG. 26 is shown with the braking power varying from zero (0) to over 8,000,000 watts, it is recognized that the amount of power is dependent on several factors including the state of the waves, the tuning, and size of the masses. The better tuned and the better controlled extraction of the power from the system will result in a wave that more closely resembles a more uniform sinusoidal wave. One benefit in a more uniform wave is that the power extracted is easier to manage. It is also recognized that the stators 248, as seen in FIGS. 23A and 23B, could be used to impart braking into the system to tune the movement of the swinging mass 152.

Referring to FIG. 27, a perspective view of a broken out section of a system 260 with an alternative floating platform 262 with an active ballast system 264 is shown. Similar to FIG. 22, the floating platform 262 has a hull 28 that is sized to contain a plurality of swinging masses 152. The swinging masses 152, while guided by a track 154, are pivotally carried by a pendulum 156. The pendulum 156 has a truss 158 that carries the pivot rod 160. The swinging masses 152 are slidably carried on a pendulum rod or a pair of pendulum rods 162 that oscillates as the pivot rod 160 rotates relative to the truss 158.

Still referring to FIG. 27, the system 260 has a plurality of counterbalance weights or masses 170 located below the hull 28, which are similar to the tuning masses 134 in FIGS. 10-12. The counterbalance masses 170 are positioned below the hull 28. Each counterbalance mass 170 is carried on a counterbalance weight rod 172. The hull 28, the truss 158, the counterbalance masses 170, and other components are all part of the first movable mass 164.

The system 260 in addition has a ballast portion 266 that is a portion of the hull 28. The ballast portion 266 has a plurality of ballast tanks 268 that are connected together. The flow of the ballast 270, a liquid such as sea water, from ballast tank 268 to ballast tank 268 is controlled by a plurality of valves 272 and/or pumps 274. The ballast 270 is moved from one ballast tank 268 to another ballast tank 268 to assist in tuning of the system 260.

Figure 28:
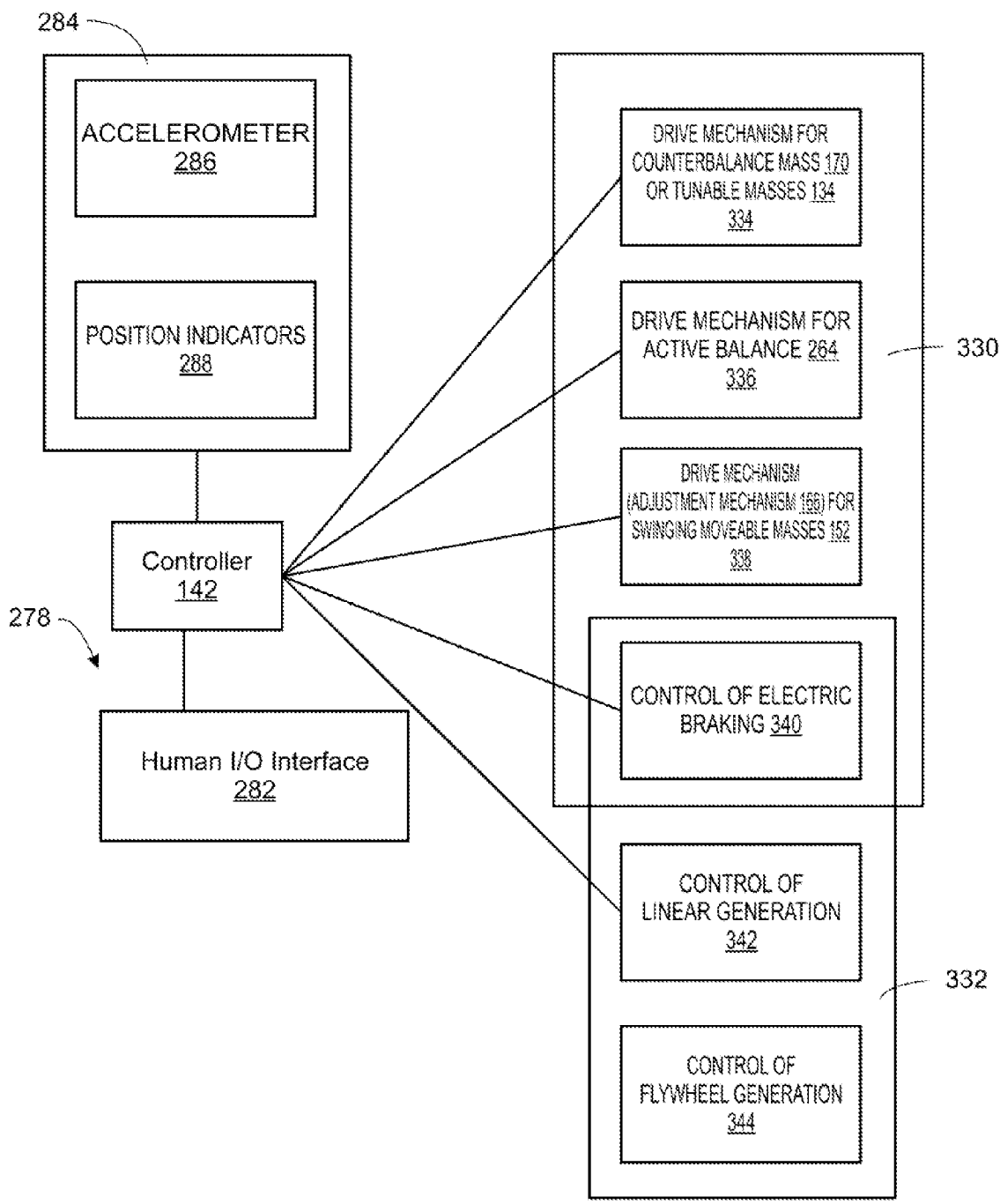
FIG. 28 is a schematic of a control system.

Referring to FIG. 28, a schematic of a control system 278 is shown. The control system 278 has a controller 142 that has a computer or microprocessor that coordinates the series of actions in the system (150, 200, 240, and 270) and monitors effects of actions. The controller 142 can receive input from various items and locations. Such inputs 280 can include a human input/output interface 282, sensors 284 such as accelerometers 286 that measure the frequency of movement of components, position indicators 288 for indicating the position of items such as the vertical height of the swinging mass 152 on pendulum rod 162. Other sensors could include power meters and global coordinate monitors.

The controller 142, based on the parameters that are given, has two different functions that of tuning the system as represented by block 330 and that of controlling the energy extraction from the system as represented by block 332. Certain functions, such as controlling the electric braking 340, can be used both for tuning the system 330 and for energy extraction 332. The system 278 can rune based on inputs and tables of data.

Figure 29:
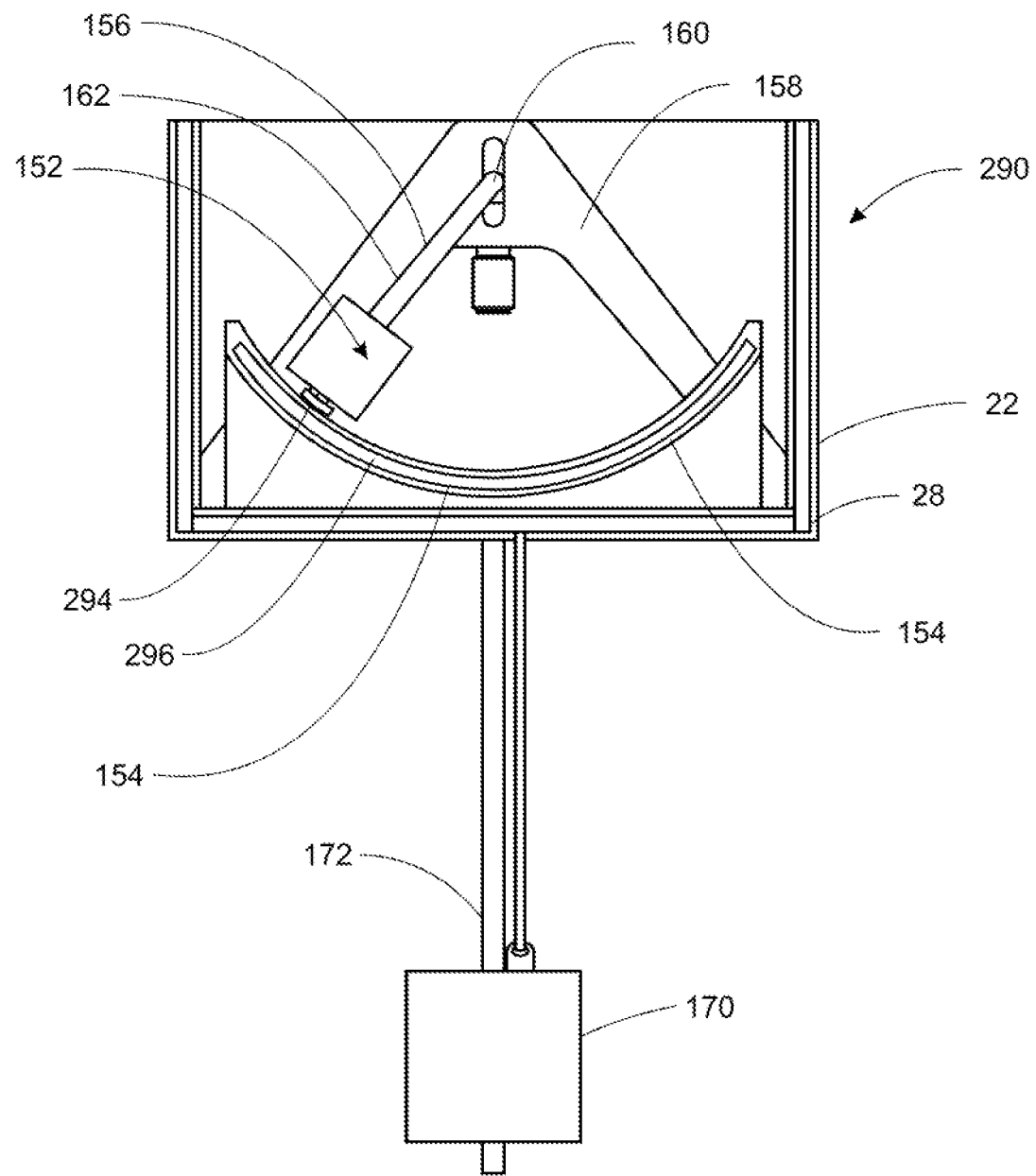
FIG. 29 is a side sectional view of an alternative floating platform.

Referring to FIG. 29, a side sectional view of an alternative floating platform 22 of a system 290 is shown. The floating platform 22 has a hull 28 that is sized to contain two sets of swinging masses 152. The swinging masses 152, while guided by a track 154, are pivotally carried by a pendulum 156. The pendulum 156 has a truss 158 that carries the pivot rod 160. The swinging masses 152 are slidably carried on a pendulum rod or a pair of pendulum rods 162 that oscillates as the pivot rod 160 rotates relative to the truss 158.

Still referring to FIG. 29, the system 290 has a plurality of counterbalance weights or masses 170 located below the hull 28. Each counterbalance mass 170 is carried on a counterbalance weight rod 172. The hull 28, the truss 158, the counterbalance masses 170, and other components are all part of the first movable mass 164.

Figure 30:
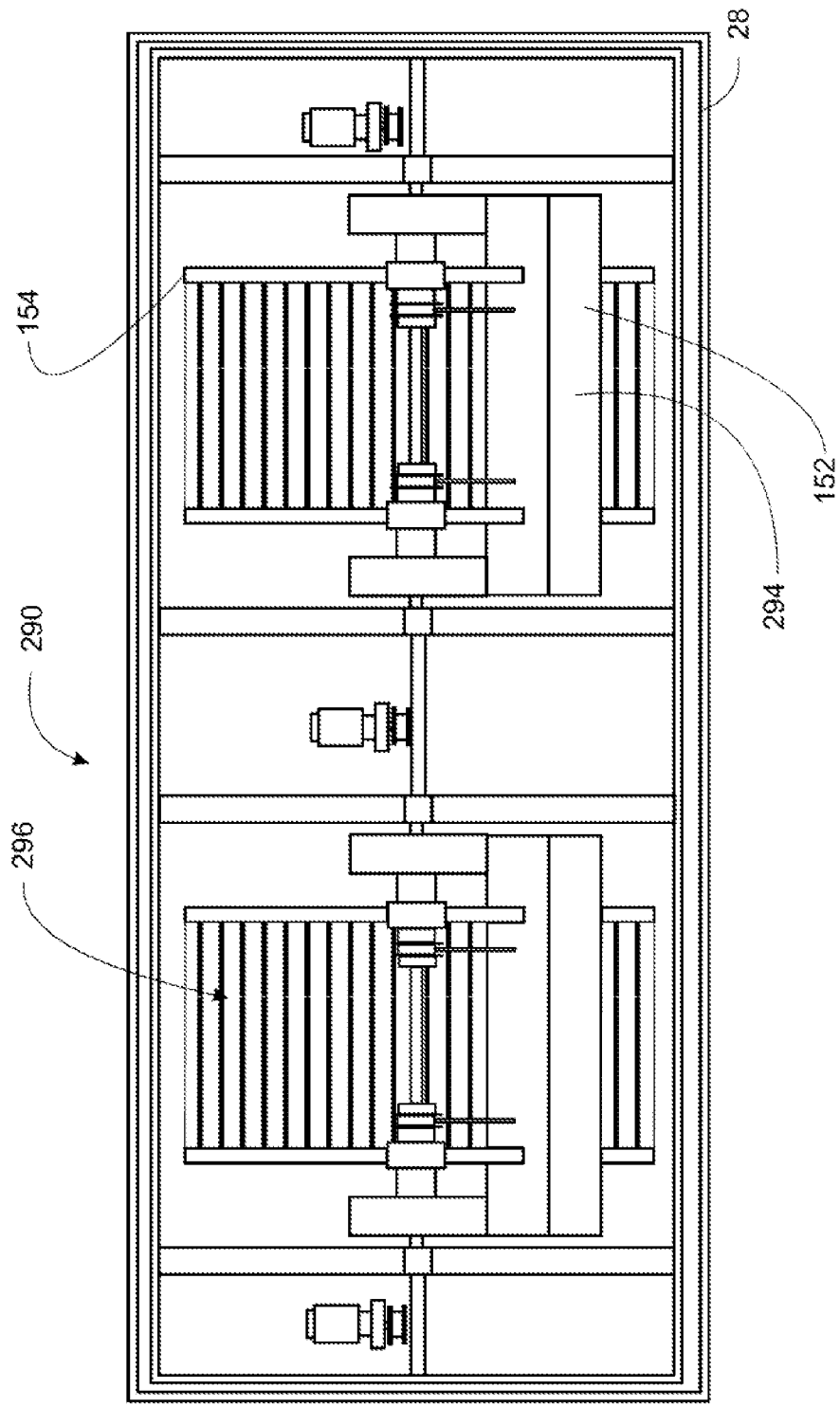
FIG. 30 is a top view of the floating platform of FIG. 29.

Similar to the embodiment shown in FIGS. 22-23B, the end of the pendulum rod 162 is a guide 244 which moves along the track 154. Below the swinging mass 152, there is a magnet 294 or series of coils to create a magnetic field or electromagnetic field. In contrast to previous embodiments where the track or rail 154 has individual stator segments 248, the system 290 has a continuous stator 296 extending between the rails 154 as best seen in FIG. 30. The spacing between the magnet 294 and the stator 296 is maintained at a constant distance, regardless of the height of the swinging mass 152 on the pendulum rods 162 for tuning. The magnetic field, generated by the magnets 294 in the swinging mass 152, cuts through the stator segments 296, which results in each stator segment 296 generating a current.

Figure 31:
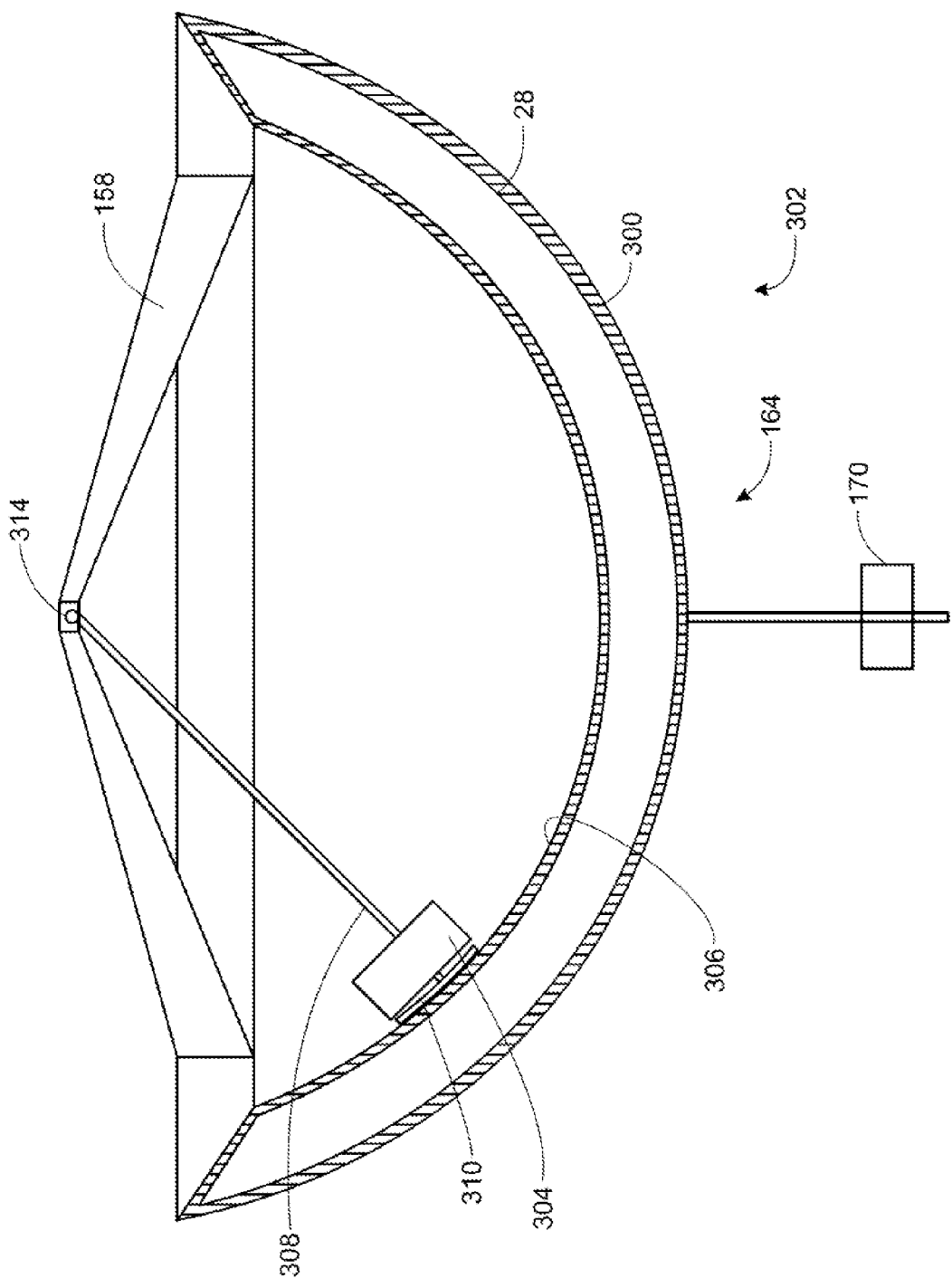
FIG. 31 is a side sectional view of an alternative floating platform.

Referring to FIG. 31, a side sectional view of an alternative floating platform 300 of an alternative system 302 is shown. The floating platform 300 is shown with a semicircular shape. A mass 304 is held above the surface 306 of the platform 300 by a pendulum 308 which allows movement in more than two directions. In a preferred embodiment, the pendulum 308 allows motion in 360 degrees such that the mass 304 may move in any direction based on the movement of the waves. In an embodiment, the pendulum rod 308 has a magnetic bearing mount 314 so that there is minimal wear on the interface. At the end of the pendulum 308, the system 302 has a series of coils 310 which are separate from the mass 304. The series of coils 310 moves relative to the hull 28 of the system 302.

Still referring to FIG. 31, the system 302 has a plurality of counterbalance weights or masses 170 located below the hull 28, which is similar to the tuning masses discussed above. The hull 28, the truss 158, the counterbalance masses 170, and other components are all part of the first movable mass 164.

Figure 32:
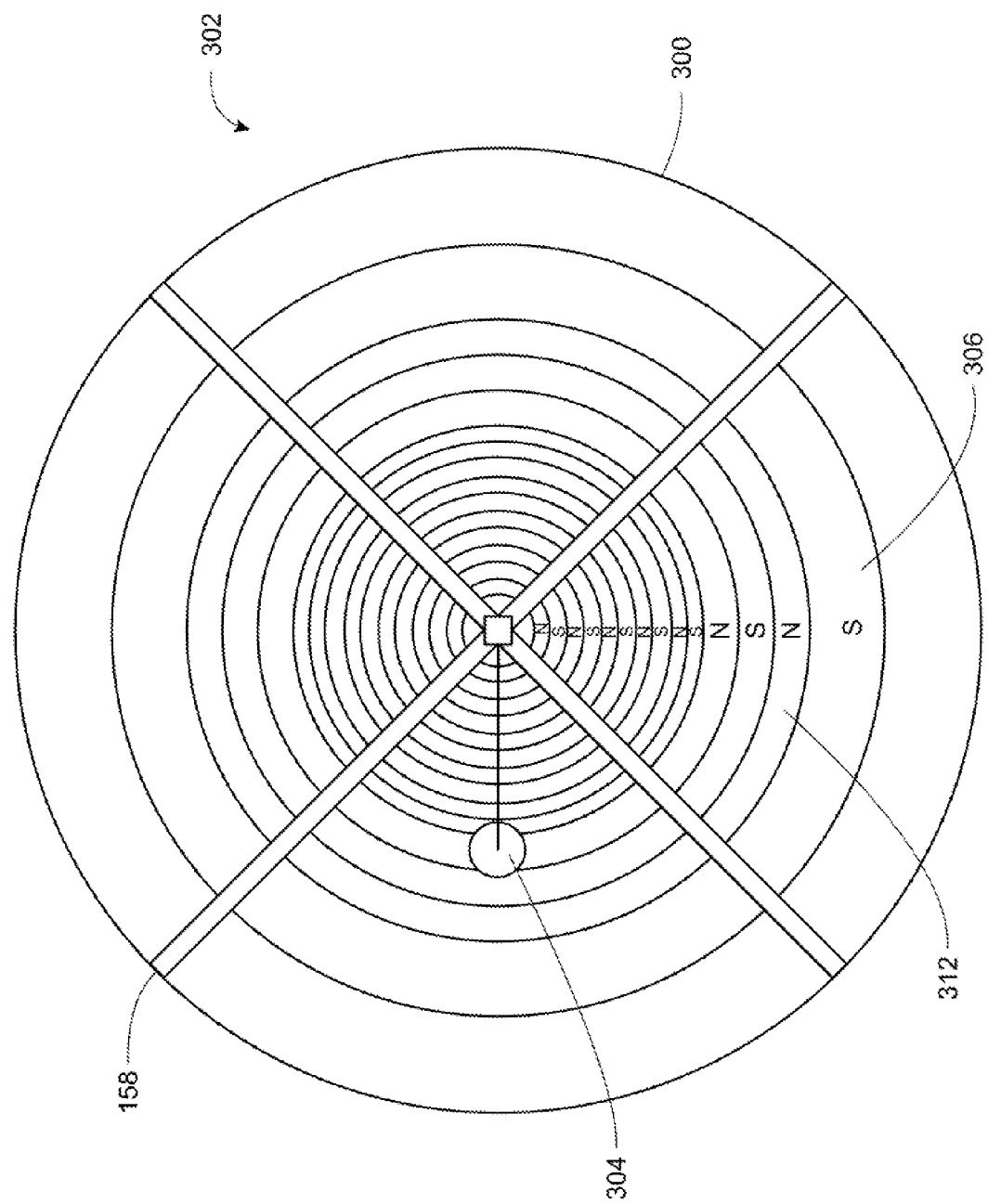
FIG. 32 is a top view of the floating platform of FIG. 31.

Referring to FIG. 32, which is a top view of the floating platform 300, the hull 28 has a series of magnetic pole pieces 312. As the series of coils, the stator, 310 passes over the magnetic pole pieces 312 it induces a current flow in the stator 310. Similar to the previous embodiments, the energy is collected.

While FIGS. 31 and 32 show the magnetic pole pieces 312 on the surface 306 of the platform 300, the pole pieces could be located at the end of pendulum 308 and the stator 310 located on the surface 305. In addition as indicated above, the magnetic pole pieces 312 can be either magnets or a series of coils to create a magnetic field or an electromagnetic field.

While the hull 28 of the floating platform 300 is shown having a semicircular shape, the hull 28 could have a round platform with a flat bottom or shaped bottom. It is desired to have a hull that is omni directional in design.

Figure 33:
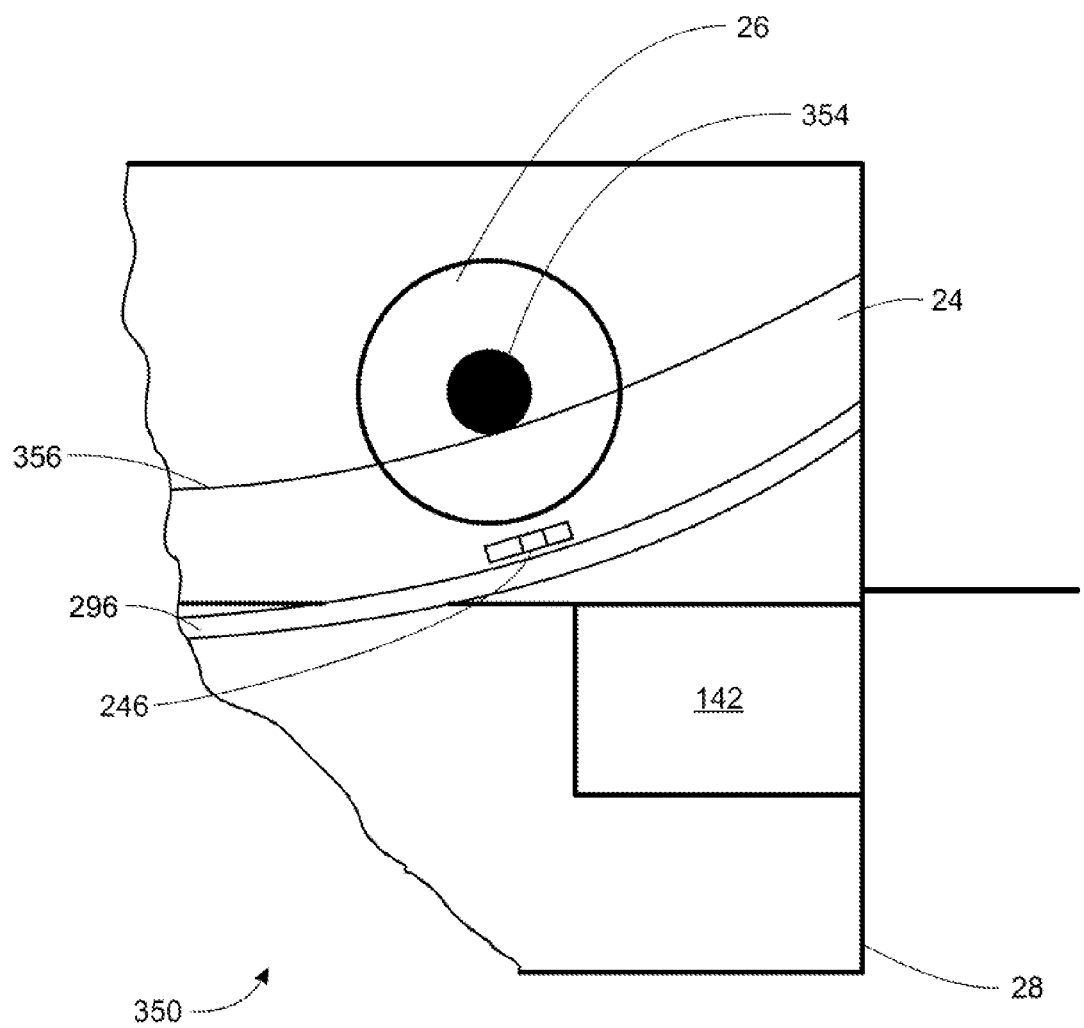
FIG. 33 is a sectional view of an alternative embodiment.

Referring to FIG. 33, a sectional view of an alternative embodiment of an energy generating system 350 is shown. The system 350 has a mass 26 that moves along a track 24 like that shown in FIGS. 10-13. The mass 26 has a guide 354 that rides along a rail 356 of the track 24. Underlying the mass 26 is a magnet 246 or series of coils to create a magnetic field or electromagnetic field. Interposed between the rails 356 of the track, there is a stator 296 similar to the embodiment shown in FIGS. 29 and 30. One of the methods of tuning that was described with respect to the embodiment in FIGS. 10-13 was a track 24 of a variable radius that can be adjusted. The system 350 could have a similar adjustment system wherein the stator 296 would move as the track adjusted so the magnet 246 and the stator 296 would be spaced consistently as the mass 26 moved and as the track 24 adjusted.

Figure 34:
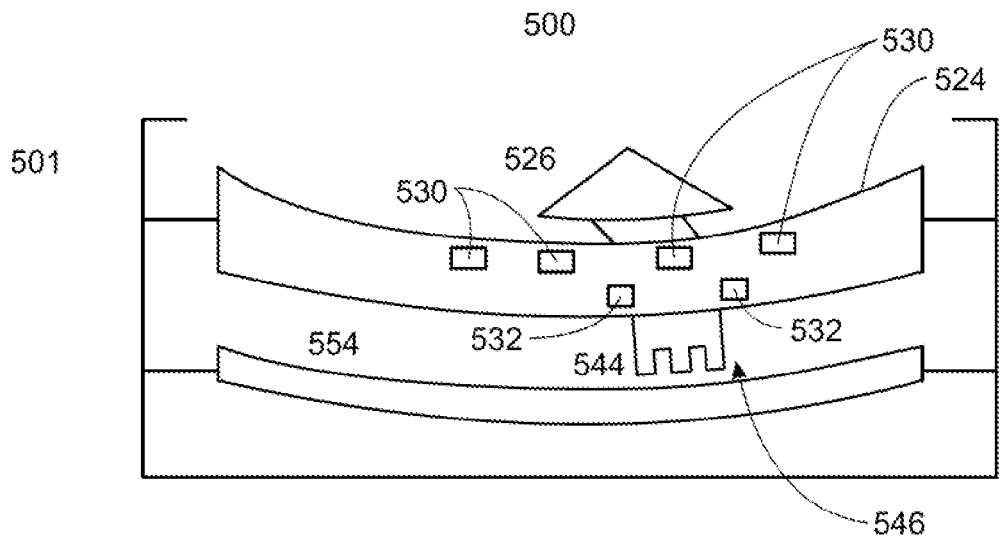
FIG. 34 is a side sectional view of an alternative floating platform.
Figure 35:
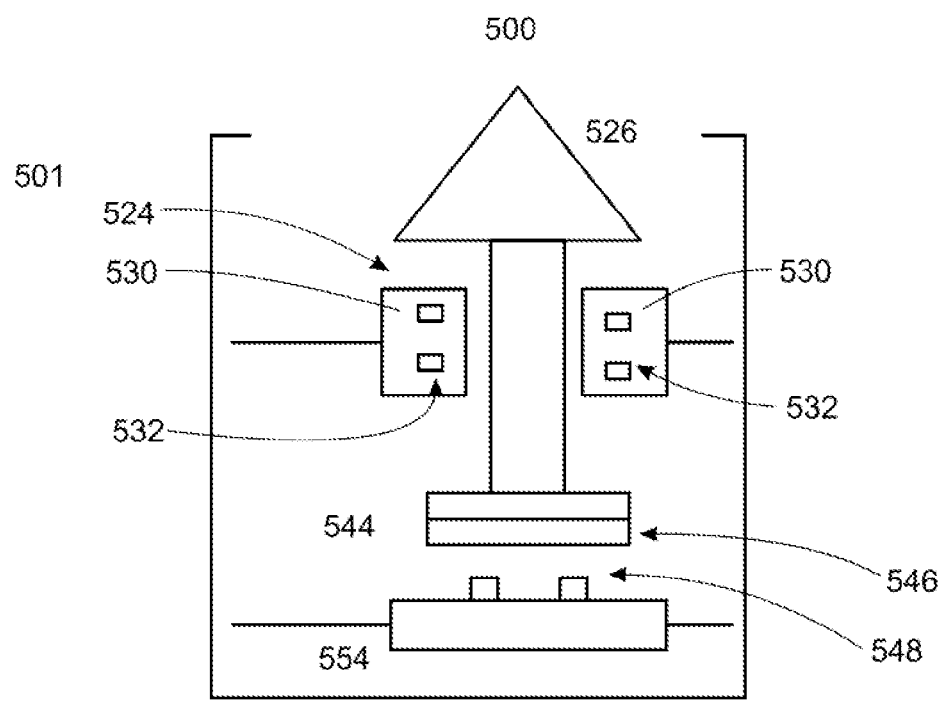
FIG. 35 is a front sectional view of the floating platform of FIG. 34.

In another preferred embodiment of the present invention, as shown in FIGS. 34 and 35, the floating platform 501 of the system 500 has a first track 524 similar to the track first shown in FIGS. 10-13, which along with the platform forms a first moveable mass. A second moveable mass 526 moves along the first track 524. In one preferred embodiment, the second moveable mass moves in an arc as though it were attached to a pendulum, the virtual pivot point of which was connected to the first movable mass. In other embodiments, the second moveable mass moves in a different path.

As first shown in FIG. 9, the second moveable mass is suspended above the track by electromagnetic force. Here, the second moveable mass 526 is suspended above the first track 524 by electromagnetic force produced by a first series of electromagnets 530. The second moveable mass 526 is oriented laterally relative to the first track 524 by a second series of electromagnets 532. The suspension and orientation of the second moveable mass eliminates friction between the second moveable mass 526 and the first track 524. The natural frequency of at least one of the moveable masses as the moveable masses move relative to each other and the body of water is actively tuned by one of the systems described herein.

Underlying the mass 526 and connected to it is guide 544. As the mass 526 moves along the first track 524, it causes the guide to move along a second track 554 on the first moveable mass.

This embodiment also has an energy extraction system having a pair of complementary energy extraction devices. The guide 544 carries one of the energy extraction devices, here a magnetic field device, a series of magnets or electromagnets, 546 to create a magnetic field, similar to that shown in FIG. 23B. The second energy extraction device is a coil device, a series of stator segments, 548 mounted on the second track 554. As the magnetic field generated in the guide 544 cuts through the stator segments 548, an electric current is generated in the stator segments 548. It should be noted that the pair of energy extraction devices can be reversed. In other words the coil device 548 can be carried in the guide and the magnetic field device 546 can be mounted on the second track 554.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

As indicated above, the first movable mass 164 includes the double-hull 28 in the embodiment shown in FIGS. 15-19D. It is recognized that the double hull configuration can be used in both the rolling/sliding mass or swinging mass configurations. The double hull construction has multiple purposes or benefits including as part of tuning of the system as indicated above. This tuning can be used in conjunction with or rather than the suspended mass/keel arrangement as discussed above. It is also recognized that water can be pumped into the double-hull in order to create a submersible or semi-submersible platform for hurricane and weather avoidance.

It is recognized that the design shape of the keel or hanging mass or other adjustable metal plates attached to the platform can be used to "tune" the platform. These elements of the platform can also be used to create a "rudder" effect to help stabilize the direction of the platform as waves pass by it. It is also recognized that the design shape of the platform can be used to "tune" the system.

Reserve Buoyancy is the part of the platform or hull that is above the water surface and is watertight, so that the system will increase buoyancy if the hull sinks deeper into the water. It is recognized that the addition of reserve buoyancy can also be accomplished by adding pontoons to the upper edges or top of the platform. As the platform shifts and inclines because of the waves, the pontoon either makes contact with the water or has a larger portion submerged under the water to create more buoyancy. If there is a pontoon on each side, the platform will increase buoyancy as the hull oscillates to the two end positions.

It is recognized that the braking system or braking mechanism 192 can be a "generative" braking system used to "tune" the second movable mass by controlling its speed and also used to generate electricity.

It is recognized that while embodiments have either shown rolling masses or swinging masses, that a system can have a hybrid that combines both swinging and rolling into one system.

It is recognized that other systems use water to generate energy, and the only way that more energy is produced is by increasing the surface area of the energy device. If more power is desired from a hydro application, the surface area of the turbine blades is increased. In the instant invention, the surface area or footprint of the hull that the hydraulic force of the ocean, the tides of the water, acts upon can remain the same, not increase, while the weight and energy output of the second movable mass increases relative to the displacement of the hull because of Archimedes' Principle, Archimedes' Principle states that a body, such as the hull, immersed in a fluid, such as the water, is buoyed up by a force equal to the weight of the displaced fluid. Therefore, the increase in the weight of the second mass will result in more displacement but not an increased surface area.

By increasing the displacement of the first movable mass without increasing the surface area of the first movable mass, weight can be added to the second movable mass increasing the power density and energy produced by the system. The system can produce an extraordinary amount of energy within a small footprint. The power density, the ratio of the amount of energy generated per square foot, of this system is comparable to that of a coal fired power plant or nuclear power plant. This concept works independent of how the second movable mass is configured. It can be a rolling/sliding mass or a swinging mass.

It is not the relationship of the weight of the second mass relative to the first mass that is important. It is that the weight of the second movable mass can be increased to provide more kinetic energy in the system without increasing the footprint, surface area, of the first movable mass, by increasing, the displacement of the first moving mass.

In addition to electrical energy generated by the system 20 being transferred to shore via an underwater cable, electrical energy created by the system 20 can be used to manufacture a fuel such as hydrogen, which can be liquefied and transferred to shore via an underwater pipeline or a cargo ship. Submarines have been using this technology for a very long time. Electricity is used to separate hydrogen and oxygen from seawater. In a submarine, oxygen is used so that crewmembers can breathe, and the hydrogen is pumped back into the sea.

Each ocean energy system 20 is a modular vessel or floating platform. Each vessel will be registered as a ship. Each modular vessel can be attached to an array of other modular vessels to create an energy farm, so to speak, of modular vessels. An array of modular vessels would have an independent energy platform housing an electrical power station and/or a system to produce a fuel such as hydrogen.

It is recognized that electricity generated by the system can be used to convert seawater into hydrogen gas. This can be done onboard or on a nearby floating platform. The electricity generated by the system can be used to produce any fuel. The electricity can be used to desalinate seawater.

It is recognized that instead of convening the energy into electricity through a generator and an inverter of the flywheel, the kinetic energy from the rotating pivot rod can be used to operate a pump that pressurizes a hydraulic accumulator. In that the rotation of the pivot rod is oscillation and is converted to a single direction that may not be constant, the pumping may not be constant, but the hydraulic accumulator stores the unregulated energy. The pressure from the hydraulic accumulator then regulates this energy with a valve and uses this regulated energy to operate a hydraulic motor at a fixed RPM that drives a generator to produce AC at a regulated voltage and frequency for one's house or grid tie-in. The accumulator acts both as an energy storage and regulating device. The regulating valve would shut off, turning off the generator, whenever pressure in the accumulator drops below a setpoint, and the energy creating device would then recharge the accumulator.

It is recognized alternatively that an electromechanically controlled variable displacement hydraulic pump can be used to regulate a constant flow to a generator. The frequency of the electricity generated is regulated. The voltage is increased or decreased by increasing or decreasing the pressure (pounds per square inches (PSI)) driving the generator as motion of the second mass increases or decreases. Hydraulic generator systems such as marketed by Bosch Rexroth can be integrated into the system.

The invention claimed is:
1. A system for generating energy from a platform tuned relative to waves in a body of water using the hydraulic force of the waves in a body of water, the system comprising:
    a platform with a first track forming a first moveable mass having a first natural frequency that is tunable relative to a wave natural frequency of the waves;
    a second movable mass moving along the first track that is suspended above the first track and oriented laterally to the first track by electromagnetic force, having a second natural frequency that is tunable relative to the first natural frequency and the wave natural frequency;
    an active tuning system for adjusting the tuning of the natural frequency of at least one of the moveable masses as the moveable masses move relative to each other and the body of water;
    an energy extraction system having a pair of complementary energy extraction devices, including a magnetic field device and a coil device, such that one of the energy extraction devices is carried by a rod connected to the second moveable mass and the other energy extraction device is connected to a second track on the first moveable mass, wherein the movement of the magnetic field device relative to the coil device creates a flow of current in the coil device.

2. A method for generating energy from a platform tuned relative to waves in a body of water using the hydraulic force of the waves in a body of water, the system comprising:

using the hydraulic force of the waves to move a platform with a first track forming a first moveable mass having a first natural frequency that is tunable relative to a wave natural frequency of the waves;

allowing a second movable mass that is suspended above the first track and oriented laterally to the first track by electromagnetic force, having a second natural frequency that is tunable relative to the first natural frequency and the wave natural frequency, to move along the first track;

adjusting, the tuning of the natural frequency of at least one of the moveable masses as the moveable masses move relative to each other and the body of water;

extracting energy using a pair of complementary energy extraction devices, including a magnetic field device and a coil device, such that one of the energy extraction devices is carried by a rod connected to the second moveable mass and the other energy extraction device is connected to a second track on the first moveable mass, wherein the movement of the magnetic field device relative to the coil device creates a flow of current in the coil device.

\* \* \* \* \*